(12) United States Patent
Liu et al.

(10) Patent No.: US 10,489,818 B2
(45) Date of Patent: *Nov. 26, 2019

(54) AUTOMATED CREATIVE EXTENSION SELECTION FOR CONTENT PERFORMANCE OPTIMIZATION

(71) Applicant: Google Inc., Mountain View, CA (US)

(72) Inventors: Wangyi Liu, Beijing (CH); Yongtai Zhu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 14/452,086

(22) Filed: Aug. 5, 2014

(65) Prior Publication Data

US 2015/0379557 A1 Dec. 31, 2015

Related U.S. Application Data

(63) Continuation of application No. PCT/CN2014/080992, filed on Jun. 27, 2014.

(51) Int. Cl.
*G06Q 30/02* (2012.01)
(52) U.S. Cl.
CPC ................. *G06Q 30/0244* (2013.01)
(58) Field of Classification Search
CPC .. G06Q 30/02; G06Q 30/0244; H04N 21/812; G06F 17/30864; G06F 17/30905
USPC ................ 704/14.4, 14.43; 715/774, 14.4; 705/14.4
See application file for complete search history.

(56) References Cited

U.S. PATENT DOCUMENTS

| | | |
|---|---|---|
| 5,794,219 A | 8/1998 | Brown |
| 5,818,914 A | 10/1998 | Fujisaki |
| 5,826,244 A | 10/1998 | Huberman |
| 5,835,896 A | 11/1998 | Fisher et al. |
| 5,890,138 A | 3/1999 | Godin et al. |

(Continued)

FOREIGN PATENT DOCUMENTS

CN      1908933      2/2007

OTHER PUBLICATIONS

International Search Report & Written Opinion on PCT/CN2014/080992 dated Mar. 2, 2015.

(Continued)

*Primary Examiner* — Beau D Spratt
(74) *Attorney, Agent, or Firm* — Foley & Lardner LLP

(57) ABSTRACT

Systems and methods for optimizing content performance using creative extensions are provided. A content generation system receives request for a content item for presentation on a client device. The request includes an indication of a serving context for the content item. The content generation system uses a creative extension performance model and the serving context for the content item to calculate a predicted performance metric for the content item for multiple different potential creative extensions. Each of the potential creative extensions defines a different action that occurs in response to a user interaction with the content item. The content generation system selects one of the potential creative extensions based on the predicted performance metrics and generates a content item having the selected creative extension using data assets extracted from various data sources. The creative extension performance model is updated using event data from the client device.

18 Claims, 8 Drawing Sheets

(56) References Cited

U.S. PATENT DOCUMENTS

| | | | |
|---|---|---|---|
| 5,905,974 A | 5/1999 | Fraser et al. | |
| 5,905,975 A | 5/1999 | Ausubel | |
| 6,023,685 A | 2/2000 | Brett et al. | |
| 6,269,361 B1 | 7/2001 | Davis et al. | |
| 9,213,749 B1 * | 12/2015 | Collins | G06F 17/30864 |
| 9,224,100 B1 * | 12/2015 | Chatterjee | G06N 99/005 |
| 9,235,850 B1 * | 1/2016 | Erat | G06Q 30/0256 |
| 2006/0149624 A1 * | 7/2006 | Baluja | G06Q 30/0255 705/14.53 |
| 2006/0287985 A1 | 12/2006 | Castro et al. | |
| 2007/0005421 A1 | 1/2007 | Labio et al. | |
| 2007/0027754 A1 | 2/2007 | Collins et al. | |
| 2007/0130004 A1 | 6/2007 | Borgs et al. | |
| 2008/0154684 A1 | 6/2008 | Kniaz et al. | |
| 2008/0228576 A1 | 9/2008 | Yonezaki | |
| 2008/0249855 A1 | 10/2008 | Collins et al. | |
| 2009/0099902 A1 | 4/2009 | Chatter et al. | |
| 2009/0298514 A1 * | 12/2009 | Ullah | G01S 5/02 455/456.5 |
| 2010/0082421 A1 | 4/2010 | Tuladhar et al. | |
| 2010/0121801 A1 | 5/2010 | Roy et al. | |
| 2010/0138291 A1 | 6/2010 | Silverman et al. | |
| 2010/0250332 A1 | 9/2010 | Ghosh et al. | |
| 2010/0262499 A1 | 10/2010 | Karlsson et al. | |
| 2011/0010239 A1 | 1/2011 | Vijay et al. | |
| 2011/0040636 A1 | 2/2011 | Simmons et al. | |
| 2011/0066498 A1 * | 3/2011 | Wojcicki | G06Q 30/02 705/14.55 |
| 2011/0208596 A1 | 8/2011 | Kwon et al. | |
| 2011/0252082 A1 * | 10/2011 | Cobb | H04L 65/605 709/203 |
| 2012/0109741 A1 * | 5/2012 | Ballapragada et al. | G06Q 30/00 705/14.43 |
| 2012/0158456 A1 | 6/2012 | Wang et al. | |
| 2012/0158485 A1 | 6/2012 | Ogawa | |
| 2012/0158490 A1 | 6/2012 | Neumeyer et al. | |
| 2012/0316957 A1 | 12/2012 | Zhou et al. | |
| 2013/0072126 A1 | 3/2013 | Topaltzas et al. | |
| 2013/0073366 A1 * | 3/2013 | Heath | G06Q 30/0261 705/14.25 |
| 2013/0268374 A1 | 10/2013 | Papineni et al. | |
| 2013/0325603 A1 | 12/2013 | Shamir et al. | |
| 2013/0339126 A1 | 12/2013 | Cui et al. | |
| 2014/0019262 A1 | 1/2014 | Reitsma et al. | |
| 2014/0114760 A1 * | 4/2014 | Reinshagen | G06Q 30/0241 705/14.54 |
| 2014/0316893 A1 | 10/2014 | Yeh et al. | |
| 2015/0106195 A1 * | 4/2015 | Holman | G06T 7/00 705/14.46 |

OTHER PUBLICATIONS

U.S. Appl. No. 12/368,834, filed Feb. 10, 2009, Feldman et al.
U.S. Appl. No. 12/394,249, filed Feb. 27, 2009, Ervin Peretz et al.
U.S. Appl. No. 12/394,392, filed Feb. 27, 2009, Ervin Peretz et al.
U.S. Appl. No. 12/702,680, filed Feb. 9, 2010, Estlin et al.
U.S. Appl. No. 12/776,792, filed May 10, 2010, Vespe et al.
Final Office Action for U.S. Appl. No. 13/562,017 dated Apr. 29, 2016.
Final Office Action for U.S. Appl. No. 13/562,017 dated Aug. 19, 2015.
Non-Final Office Action for U.S. Appl. No. 13/562,017 dated Jan. 5, 2016.
Non-Final Office Action for U.S. Appl. No. 13/562,017 dated Feb. 12, 2015.
Non-Final Office Action for U.S. Appl. No. 13/562,017 dated Apr. 22, 2014.
Non-Final Office Action for U.S. Appl. No. 13/562,017 dated Jun. 16, 2014.
Non-Final Office Action for U.S. Appl. No. 13/601,765 dated Jun. 3, 2014.
Non-Final Office Action for U.S. Appl. No. 15/223,555 dated Dec. 17, 2018.

\* cited by examiner

AUTOMATED CREATIVE EXTENSION SELECTION FOR CONTENT PERFORMANCE OPTIMIZATION

CROSS-REFERENCE TO RELATED PATENT APPLICATIONS

This application is a continuation of International Application PCT/CN2014/080992, filed Jun. 27, 2014, the entirety of which is incorporated by reference herein.

BACKGROUND

In a computerized content delivery network, content providers typically design and provide content items (e.g., advertisements) to a content server. The content server then distributes the content items to various client devices via one or more content slots of an electronic resource. Content items often include images, videos, graphics, text, and/or other visual imagery. It can be difficult and challenging for content providers to create effective and attractive content items.

SUMMARY

One implementation of the present disclosure is a method for optimizing content performance using click types. The method includes receiving, at a processing circuit, a request for a content item for presentation on a client device. The request includes an indication of a serving context for the content item. The method further includes using a click type performance model and the serving context for the content item to calculate, by the processing circuit, a predicted performance metric for the content item for multiple different potential click types. Each of the potential click types defines different criteria for triggering an event that occurs in response to a user interaction with the content item when the defined criteria are satisfied. The method further includes selecting, by the processing circuit, one of the potential click types based on the predicted performance metrics and generating a content item having the selected click type. The content item is generated by the processing circuit in response to the request. The method further includes serving the generated content item for presentation on the client device.

In some implementations, the method includes collecting and storing event data describing user actions with respect to content items having each of the potential click types and using the event data as feedback for training the click type performance model.

In some implementations, the different criteria defined by the potential click types include different types of user interactions with the content item. In some implementations, each of the potential click types defines different criteria for calculating the performance metric.

In some implementations, selecting one of the potential click types includes selecting a button click type. When the button click type is selected, the method may further include defining the criteria for triggering the event as a user interaction with a first portion of the content item excluding user interactions with a second portion of the content item separate from the first portion and rendering a clickable button that occupies only the first portion of the content item.

In some implementations, selecting one of the potential click types includes selecting a whole content item click type. When the whole content item click type is selected, the method may further include defining the criteria for triggering the event as a user interaction with any portion of the content item and rendering an entire display area of the content item as a clickable element.

In some implementations, selecting one of the potential click types includes selecting a confirmation click type. When the confirmation click type is selected, the method may further include displaying a confirmation prompt in response to a first user interaction with the content item and defining the criteria for triggering the event as a second user interaction with the content item occurring after the first user interaction and while the confirmation prompt is displayed.

In some implementations, the serving context includes at least one of a type of the client device, a platform of the client device, and a resource in conjunction with which the content item will be presented.

In some implementations, selecting one of the potential click types includes selecting the click type associated with an extremum of the predicted performance metrics for the potential click types.

In some implementations, the method further includes comparing the predicted performance metric with a threshold value. Selecting one of the potential click types may include selecting a first of the potential click types if the predicted performance metric is less than the threshold value and selecting a second of the potential click types if the predicted performance metric is not less than the threshold value.

Another implementation of the present disclosure is a system for optimizing content performance using click types. The system includes a processing circuit having a processor and memory. The processing circuit is configured to receive a request for a content item for presentation on a client device. The request includes an indication of a serving context for the content item. The processing circuit is further configured to use a click type performance model and the serving context for the content item to calculate a predicted performance metric for the content item for multiple different potential click types. Each of the potential click types defines different criteria for triggering an event that occurs in response to a user interaction with the content item when the defined criteria are satisfied. The processing circuit is further configured to select one of the potential click types based on the predicted performance metrics, generate a content item having the selected click type in response to the request, and serve the generated content item for presentation on the client device.

In some implementations, the processing circuit is configured to collect and store event data describing user actions with respect to content items having each of the potential click types and use the event data as feedback for training the click type performance model.

In some implementations, the different criteria defined by the potential click types include different types of user interactions with the content item. In some implementations, each of the potential click types defines different criteria for calculating the performance metric.

In some implementations, selecting one of the potential click types includes selecting a button click type. When the button click type is selected, the processing circuit may be configured to define the criteria for triggering the event as a user interaction with a first portion of the content item excluding user interactions with a second portion of the content item separate from the first portion and render a clickable button that occupies only the first portion of the content item.

In some implementations, selecting one of the potential click types includes selecting a whole content item click type. When the whole content item click type is selected, the processing circuit may be configured to define the criteria for triggering the event as a user interaction with any portion of the content item and render an entire display area of the content item as a clickable element.

In some implementations, selecting one of the potential click types includes selecting a confirmation click type. When the confirmation click type is selected, the processing circuit may be configured to configure the content item to cause a confirmation prompt to be displayed response to a first user interaction with the content item and define the criteria for triggering the event as a second user interaction with the content item occurring after the first user interaction and while the confirmation prompt is displayed.

In some implementations, the serving context includes at least one of a type of the client device, a platform of the client device, and a resource in conjunction with which the content item will be presented.

In some implementations, selecting one of the potential click types includes the click type associated with an extremum of the predicted performance metrics for the potential click types.

In some implementations, the processing circuit is configured to compare the predicted performance metric with a threshold value. Selecting one of the potential click types may include selecting a first of the potential click types if the predicted performance metric is less than the threshold value and selecting a second of the potential click types if the predicted performance metric is not less than the threshold value.

Another implementation of the present disclosure is a method for optimizing content performance using creative extensions. The method includes receiving, at a processing circuit, a request for a content item for presentation on a client device. The request includes an indication of a serving context for the content item. The method further includes using a creative extension performance model and the serving context for the content item to calculate, by the processing circuit, a predicted performance metric for the content item for multiple different potential creative extensions. Each of the potential creative extensions defines a different action that occurs in response to a user interaction with the content item. The method further includes selecting, by the processing circuit, one of the potential creative extensions based on the predicted performance metrics and generating a content item having the selected creative extension. The content item is generated by the processing circuit in response to the request. The method further includes serving the generated content item for presentation on the client device.

In some implementations, the method includes collecting and storing event data describing user actions with respect to content items having each of the potential creative extensions and using the event data as feedback for training the creative extension performance model.

In some implementations, the method includes extracting data assets from at least one of a landing resource associated with the content item, a secondary resource associated with the landing resource, and a customer information database. The method may include using the extracted data assets to determine which of the potential creative extensions are available for selection. In some implementations, using the extracted data assets to determine which of the potential creative extensions are available for selection includes identifying a data asset required for generating a creative extension, determining whether the identified data asset has been extracted, and determining that the creative extension is unavailable for selection in response to a determination that the required data asset has not been extracted.

In some implementations, selecting one of the potential creative extensions includes using the serving context for the content item to determine which of the potential creative extensions are available for selection.

In some implementations, selecting one of the potential creative extensions includes selecting a click-to-call extension. When the click-to-call extension is selected, the method may include using extracted contact information to generate a creative extension configured to initiate a communication with an entity associated with the content item and rendering the generated creative extension as a selectable element of the content item.

In some implementations, selecting one of the potential creative extensions includes selecting a location extension. When the location extension is selected, the method may include using extracted location information to generate a creative extension configured to launch a maps application or display a geographic location associated with the content item and rendering the generated creative extension as a selectable element of the content item.

In some implementations, selecting one of the potential creative extensions includes selecting a secondary resource extension. When the secondary resource extension is selected, the method may include using extracted secondary resource information to generate a creative extension configured to cause the client device to navigate to a secondary resource associated with the content item and rendering the generated creative extension as a selectable element of the content item.

In some implementations, selecting one of the potential creative extensions includes selecting the creative extension associated with an extremum of the predicted performance metrics for the potential creative extensions.

In some implementations, the serving context includes at least one of a type of the client device, a platform of the client device, and a resource in conjunction with which the content item will be presented.

Another implementation of the present disclosure is a system for optimizing content performance using creative extensions. The system includes a processing circuit having a processor and memory. The processing circuit is configured to receive a request for a content item for presentation on a client device. The request includes an indication of a serving context for the content item. The processing circuit is further configured to use a creative extension performance model and the serving context for the content item to calculate a predicted performance metric for the content item for multiple different potential creative extensions. Each of the potential creative extensions defines a different action that occurs in response to a user interaction with the content item. The processing circuit is further configured to select one of the potential creative extensions based on the predicted performance metrics, generate a content item having the selected creative extension in response to the request, and serve the generated content item for presentation on the client device.

In some implementations, the processing circuit is configured to collect and store event data describing user actions with respect to content items having each of the potential creative extensions and use the event data as feedback for training the creative extension performance model.

In some implementations, the processing circuit is configured to extract data assets from at least one of a landing resource associated with the content item, a secondary resource associated with the landing resource, and a customer information database. The processing circuit may use the extracted data assets to determine which of the potential creative extensions are available for selection. In some implementations, using the extracted data assets to determine which of the potential creative extensions are available for selection includes identifying a data asset required for generating a creative extension, determining whether the identified data asset has been extracted, and determining that the creative extension is unavailable for selection in response to a determination that the required data asset has not been extracted.

In some implementations, selecting one of the potential creative extensions includes using the serving context for the content item to determine which of the potential creative extensions are available for selection.

In some implementations, selecting one of the potential creative extensions includes selecting a click-to-call extension. When the click-to-call extension is selected, the processing circuit may be configured to use extracted contact information to generate a creative extension configured to initiate a communication with an entity associated with the content item and render the generated creative extension as a selectable element of the content item.

In some implementations, selecting one of the potential creative extensions includes selecting a location extension. When the location extension is selected, the processing circuit may be configured to use extracted location information to generate a creative extension configured to launch a maps application or display a geographic location associated with the content item and render the generated creative extension as a selectable element of the content item.

In some implementations, selecting one of the potential creative extensions includes selecting a secondary resource extension. When the secondary resource extension is selected, the processing circuit may be configured to use extracted secondary resource information to generate a creative extension configured to cause the client device to navigate to a secondary resource associated with the content item and render the generated creative extension as a selectable element of the content item.

In some implementations, selecting one of the potential creative extensions includes selecting the creative extension associated with an extremum of the predicted performance metrics for the potential creative extensions.

In some implementations, the serving context includes at least one of a type of the client device, a platform of the client device, and a resource in conjunction with which the content item will be presented.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
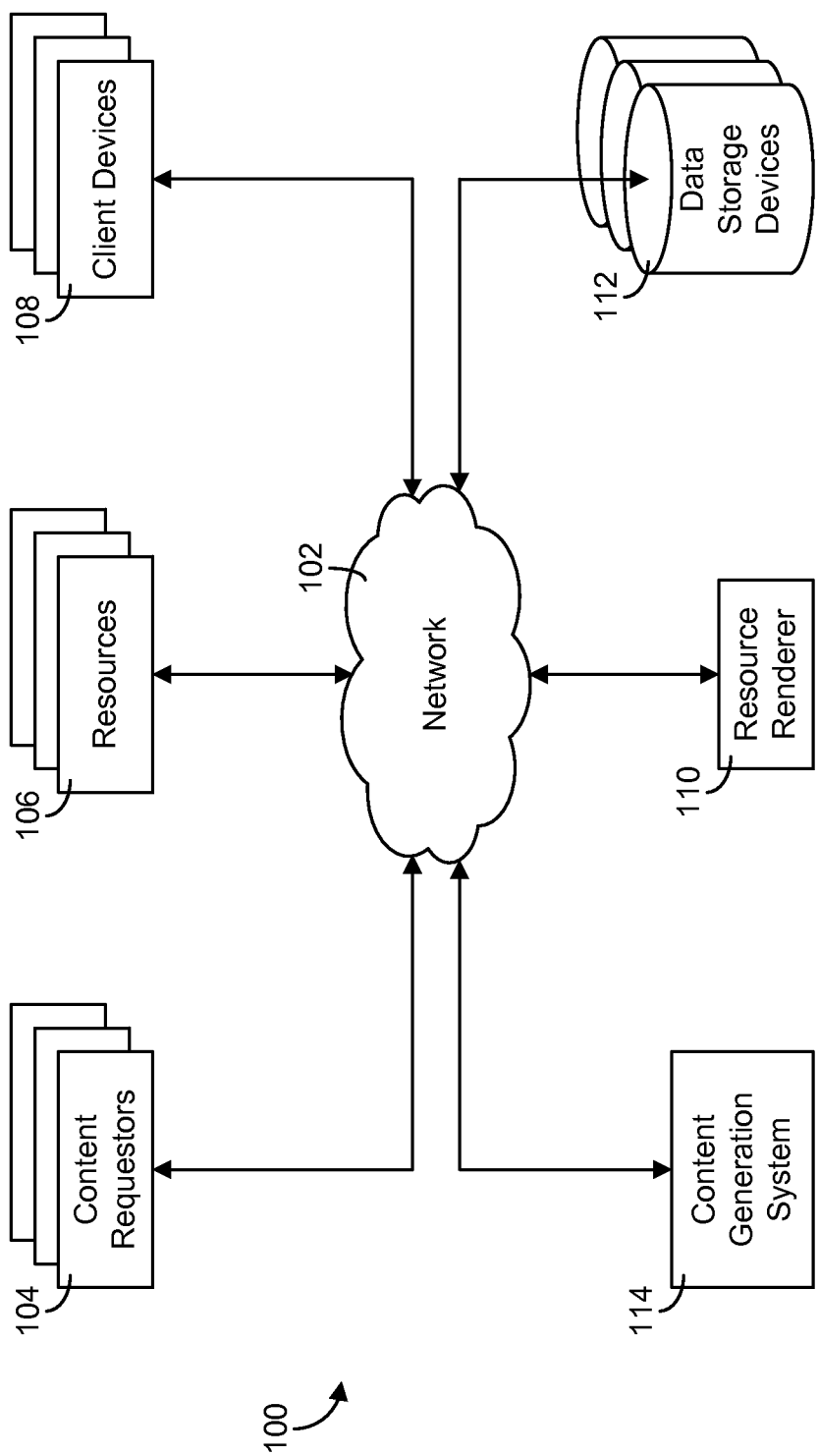
FIG. 1 is a block diagram of a computer system having a content generation system configured to optimize content performance using click types and creative extensions, according to a described implementation.

Referring generally to the FIGURES, systems and methods for automated content generation and optimization are shown, according to various implementations. The systems and methods described herein may be used to automatically generate content items (e.g., advertisements) that are tailored to a particular content provider, a particular resource (e.g., a webpage), a particular platform (e.g., display content, video content, mobile device content, text content, etc.), a particular interest profile (e.g., a set of user interests), a particular impression, or any combination thereof. The content items may be generated by an automated content generation system, served to client devices, and presented to users via the client devices. The generated content items may be configured to direct the client devices to a landing resource (e.g., via an embedded hyperlink) in response to a user interaction therewith (e.g., clicking the content item, hovering over a content item, etc.).

In some implementations, the content generation system extracts data assets from the landing resource and/or other related data sources (e.g., a secondary resource associated with the landing resource, a separate database, etc.). The resources from which the data assets are extracted may be defined by the identity of the landing resource. Extracted data assets may include images, colors, fonts, text, graphics, videos, styles, business-related information (e.g., geographic location, contact information, etc.), page classification, and/or other types of data related to the landing resource. The content generation system may use the extracted data assets to generate content items that direct to the landing resource and/or the associated secondary resource (e.g., via an embedded hyperlink) in response to a user interaction with the generated content item.

User actions with respect to the generated content items (e.g., clicks, conversions, and other types of events) may be logged and used to optimize the performance of subsequent content items that are generated by the content generation system. The performance of the generated content items may be quantified using various performance metrics and/or statistical data derived from the logged user actions. One example of such a performance metric is a click-through rate (CTR) associated with a content item, a group of content items, or a content distribution campaign. The CTR for a content item may be defined as the percentage of clicks on the content item that result in conversions $$\left(\text{i.e., } CTR = \frac{\text{\# of conversions}}{\text{\# of clicks}}\right).$$

Conversions may be any event or user action that satisfies predetermined conversion criteria (e.g., a product purchase, creating a user account, a threshold time spent viewing a particular resource, etc.).

In some implementations, content providers are billed for content items on a cost-per-click (CPC) basis. However, not all clicks result in conversions. In CPC billing systems, the CTR for a content item may correlate with a return on investment (ROI) realized by the content provider. Content providers generally seek to maximize the ROI associated with their content distribution campaigns. One way to maximize ROI is to optimize content selection and distribution decisions with the goal of maximizing various performance metrics such as CTR.

The content generation system described herein may optimize content performance by automatically adjusting various elements, features, or attributes of the generated content items. In some implementations, the content generation system uses one or more predictive models to calculate an estimated performance metric for a particular feature or combination of features in the generated content items. The content generation system may use the predictive models to select optimal features to include in the generated content items for a particular serving context. The predictive models may be configured to receive inputs such as landing resource ID (e.g., a URL) or type (e.g., a page classification), device type (e.g., mobile, tablet, desktop, etc.), content platform (e.g., video, text, image, etc.), device location, user interests, or other information describing a serving context and/or an available impression. The predictive models may be used to calculate a predicted performance metric (e.g., a predicted click-through rate (pCTR)) for various content item features based on the given serving context.

In some implementations, the content generation system uses logged events and/or statistical data associated with previously-generated content items to train the predictive models. The logged event data may be used as a feedback signal for the predictive models and may be used to adjust various parameters of the predictive models (e.g., using machine learning techniques). Using actual event data to train the predictive models may improve prediction accuracy and may allow the predictive models to be updated (e.g., at regular intervals or continuously) as new events are logged.

One content item feature that can be optimized by a predictive model is a "click type" of the content item. The click type for a content item may affect the layout of the content item, the interactivity of the content item, and/or how the content item is rendered or presented by a client device. In some implementations, the click type for a content item defines the types of user actions that qualify as a "click" for purposes of billing content providers and calculating the pCTR. The content generation system may select a click type from a plurality of different click types including a "button" click type, a "whole content item" click type, and a "confirmation" click type.

The button click type may define a click as a user interaction with a specific portion of the content item such as a clickable button or other subset of the total area of the content item. For content items that have the button click type, user interactions with other portions of the content item (e.g., portions outside the clickable area) may not cause the client device to navigate to the landing resource and may not qualify as clicks for purposes of billing and/or performance metric calculation.

The whole content item click type may define a click as a user interaction with any portion of the content item. For content items that have the whole content item click type, user interactions with any portion of the content item may cause the client device to navigate to the landing resource and may qualify as clicks for purposes of billing and/or performance metric calculation.

The confirmation click type may cause the content item to display a confirmation prompt in response to a first user interaction with the content item (e.g., a first click). The confirmation prompt may display a message instructing the user to click again to navigate to the landing resource. For content items that have the confirmation click type, a second user interaction with the content item (e.g., a second click) may cause the client device to navigate to the landing resource and may qualify as a click for purposes of billing and/or performance metric calculation. The confirmation click type may be useful to protect against inadvertent clicks that are not likely to result in a conversion.

Another content item feature that can be optimized by a predictive model is a "creative extension" feature of the content item. A creative extension may be a supplemental element of the content item in addition to the primary "creative" portion. Creative extensions may include clickable buttons such as a "click-to-call" button, a "location" button, a "secondary resource" button, and/or other types of supplemental content that can be included in the content item. Each creative extension may cause a different action to occur when the corresponding portion of the content item is clicked.

The click-to-call button may be included for content items displayed on a mobile communications device when a telephone number or other contact information is known for an entity associated with the content item. Such contact information can be automatically extracted from the landing resource or retrieved from a separate database. Selecting the click-to-call button may initiate a telephone call or other communication with the entity associated with the content item (e.g., a retail store, a customer service line, a sales representative, etc.). For other device types (e.g., a desktop computer, a tablet, etc.) a "click-to-email" button or more general "click-to-contact" button may be included in place of the click-to-call button when contact information is known.

The location button may cause a map depicting the geographic location of a business associated with the landing resource to be displayed. The geographic location (e.g., street address, store location, mailing address, GPS coordinates, etc.) of the associated business may be extracted from the landing resource, a separate database, or resource associated with the landing resource. Selecting the location button may cause a maps application to be loaded (e.g., on a mobile device) or may cause a user's web browser to navigate to a maps resource (e.g., Google Maps).

The secondary resource button may cause a secondary resource to be displayed. The content item may include creative extensions (e.g., selectable buttons or links) for multiple different resources or portions of a resource (e.g., the secondary resource, a social resource, the landing resource, etc.). In some implementations, the content item links only to the secondary resource (and not the landing resource) and may be referred to as a social content item. In other implementations, the content item links to both the landing resource and the secondary resource.

The content items generated by the content generation system are served to client devices over a communications network (e.g., the Internet). Events associated with the content items (e.g., impressions, clicks, conversions, etc.) are logged and stored in a database accessible to the content generation system. The content generation system uses the logged events to calculate performance metrics associated with the content items and to train the predictive models. The content generation system uses the predictive models to determine which feature or combination of features of the content items are estimated to result in optimal content performance for a given serving context (e.g., features that optimize CTR, pCTR, or another performance metric). The content generation system may then automatically create content items having the features estimated to result in optimal content performance.

Referring now to FIG. 1, a block diagram of a computer system 100 is shown, according to a described implementation. Computer system 100 is shown to include a network 102, content requestors 104, resources 106, client devices 108, a resource renderer 110, data storage devices 112, and a content generation system 114.

Network 102 may include any type of computer network such as local area networks (LAN), wide area networks (WAN), cellular networks, satellite networks, radio networks, the Internet, or any other type of data network. Network 102 may include any number of computing devices (e.g., computers, servers, routers, network switches, etc.) configured to transmit, receive, or relay data. Network 102 may further include any number of hardwired and/or wireless connections. For example, content requestor 104 may communicate wirelessly (e.g., via WiFi, cellular, radio, etc.) with a transceiver that is hardwired (e.g., via a fiber optic cable, a CAT5 cable, etc.) to a computing device of network 102.

Network 102 may facilitate communications between content generation system 114 and content requestors 104. Content generation system 114 may receive a content generation request from content requestors 104 via network 102. Content generation system 114 may create content items in response to the request and provide the generated content items to content requestors 104 for review or approval.

Network 102 may also facilitate communications between content generation system 114, resources 106, and resource renderer 110. Content generation system 114 may receive data assets from resources 106 and/or resource renderer 110. Upon receiving a request for content generation, content generation system 114 may invoke resource renderer 110 to obtain (e.g., download) and render data (e.g., HTML data, webpage data, etc.) from resources 106. Resource renderer 110 may receive data from resources 106 via network 102 and render such data as a snapshot image (e.g., a visual representation of resources 106) and/or as a document object model (DOM) tree. The rendered data may be transmitted from resource renderer 110 to content generation system 114 via network 102.

Still referring to FIG. 1, computer system 100 is shown to include content requestors 104. Content requestors 104 may include one or more entities from which a request to generate content items is received. For example, content requestors 104 may include an advertiser, an advertising agency, a third-party content provider, a publisher, a website provider, or any other entity from which a request to generate content items can be received.

In some implementations, content requestors 104 include one or more electronic devices (e.g., a computer, a computer system, a server, etc.) capable of submitting a request for content generation. Content requestors 104 may include a user input device (e.g., keyboard, mouse, microphone, touch-screen, tablet, smart phone, etc.) through which a user may input content generation request. Content requestors 104 may submit a content generation request to content generation system 114 via network 102. In some implementations, the content generation request includes a uniform resource locator (URL). The URL may specify a location of a particular landing resource (e.g., one of resources 106).

In some implementations, content requestors 104 submit campaign parameters to content generation system 114. The campaign parameters may be used to control the distribution of content items produced by content generation system 114. The campaign parameters may include keywords associated with the content items, bids corresponding to the keywords, a content distribution budget, geographic limiters, or other criteria used by content generation system 114 or a separate content server to determine when a content item may be presented to client devices 108.

Content requestors 104 may access content generation system 114 to monitor the performance of the content items distributed according to the established campaign parameters. For example, content requestors 104 may access content generation system 114 to review one or more performance metrics associated with a content item or set of content items. The performance metrics may describe the interactions between client devices 108 with respect to a distributed content item or set of content items (e.g., a CTR, a number of impressions, number of clicks, number of conversions, an amount spent, etc.). The performance metrics may be based on user actions logged and processed by an accounting system or a log file processing system.

Still referring to FIG. 1, computer system 100 is shown to include resources 106. Resources 106 may include any type of information or data structure that can be provided over network 102. In some implementations, resources 106 may be identified by a resource address such as a uniform resource locator (URL). Resources 106 may include web pages (e.g., HTML web pages, PHP web pages, etc.), word processing documents, portable document format (PDF) documents, images, video, programming elements, interactive content, streaming video/audio sources, or other types of electronic information.

Resources 106 may include local resources, intranet resources, Internet resources, or other network resources. In some implementations, resources 106 include one or more webpages to which a client devices 108 are directed (e.g., via an embedded hyperlink) when client devices 108 interact with a content item generated by content generation system 114. In some implementations, resources 106 provide additional information relating to a product, service, or business featured in the generated content item. For example, resources 106 may be a webpage or website through which a product or service featured in the generated content item may be purchased.

Resources 106 may include landing resources and/or secondary resources. In some implementations, a landing resource is specified by content requestors 104 as part of a request to generate content items. The landing resource may be specified as a URL which directs to one of resources 106 or otherwise specifies the location of the landing resource. The URL of the landing resource may be included as part of the content generation request. Secondary resources may be associated with a specified landing resource. Secondary resources may include any type of resources 106 (e.g., webpages, websites, word processing documents, videos, PDF documents, etc.) and may be associated with a primary landing resource. In various implementations, an association between a landing resource and a secondary resource may be identified and/or generated using data assets extracted from the landing resource (e.g., a hyperlink that links from the landing resource to the secondary resource) and/or a previously-stored association between the landing resource and the secondary resource (e.g., stored in data storage devices 112). In some implementations, content generation system 114 accesses data storage devices 112 to identify a secondary resource associated with a specified landing resource.

In some implementations, resources 106 may be combined with content requestors 104. For example, resources 106 may include data stored on the one or more electronic devices (e.g., computers, servers, etc.) maintained by content requestors 104. In other implementations, resources 106 may be separate from content requestors 104. For example, resources 106 may include data stored on a remote server (e.g., FTP servers, file sharing servers, web servers, etc.), combinations of servers (e.g., data centers, cloud computing platforms, etc.), or other data storage devices separate from content requestors 104.

Still referring to FIG. 1, computer system 100 is shown to include client devices 108. Client devices 108 may include any number and/or type of user-operable electronic devices. For example, client devices 108 may include desktop computers, laptop computers, smartphones, tablets, mobile communication devices, remote workstations, client terminals, entertainment consoles, or any other devices capable of interacting with the other components of computer system 100 (e.g., via a communications interface). Client devices 108 may be capable of receiving resource content from resources 106 and/or third-party content items generated by content generation system 114. Client devices 108 may include mobile devices or non-mobile devices.

In some implementations, client devices 108 include an application (e.g., a web browser, a resource renderer, etc.) for converting electronic content into a user-comprehensible format (e.g., visual, aural, graphical, etc.). Client devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). Client devices 108 may function as a user agent for allowing a user to view HTML encoded content.

Client devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, client devices 108 are capable of detecting an interaction with a distributed content item. An interaction with a content item may include displaying the content item, hovering over the content item, clicking on the content item, viewing source information for the content item, or any other type of interaction between client devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item) by content requestors 104 or by content generation system 114.

Client devices 108 may generate event data describing user actions with respect to content items. For example, client devices 108 may generate event data in response to a detected interaction with a content item. The event data may include a plurality of attributes including a content identifier (e.g., a content ID or signature element), a device identifier, a referring URL identifier, a timestamp, or any other attributes describing the interaction. In some implementations, event data includes an indication of a serving context (e.g., device type, platform, etc.) and an indication of one or more attributes of the served content item (e.g., click type, creative extension, etc.). Client devices 108 may generate event data when particular actions are performed by a client device (e.g., resource views, online purchases, search queries submitted, etc.). The event data generated by client devices 108 may be communicated to content generation system 114 or a separate accounting system. Content generation system 114 may use the event data to train a predictive model for optimizing content performance.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content generation system 114) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 108, etc.) and used by content generation system 114.

Still referring to FIG. 1, system 100 is shown to include a resource renderer 110. Resource renderer 110 may be a hardware or software component capable of interpreting resources 106 and creating a rendered representation (e.g., an image, a display, etc.) thereof. For example, resources 106 may include marked up content (e.g., HTML, XML, image URLs, etc.) as well as formatting information (e.g., CSS, XSL, etc.). Resource renderer 110 may download the marked up content and formatting information and render resources 106 according to World Wide Web Consortium (W3C) standards. Resource renderer 110 may create a "snapshot image" of resources 106 and/or construct a document object model (DOM) tree representing resources 106.

The snapshot image may be a visual representation of a particular landing resource. The snapshot image may illustrate the visual appearance of the landing resource as presented on a user interface device (e.g., an electronic display screen, a computer monitor, a touch-sensitive display, etc.) after rendering landing resource. The snapshot image may include color information (e.g., pixel color, brightness, saturation, etc.) and style information (e.g., square corners, rounded edges, modern, rustic, etc.) for landing resource. In some implementations, the snapshot image may be a picture file having any viable file extension (e.g., .jpg, .png, .bmp, etc.).

The DOM tree may be a hierarchical model of a particular landing resource. The DOM tree may identify a plurality of data assets of the landing resource. The DOM tree may include image information (e.g., image URLs, display positions, display sizes, alt text, etc.), font information (e.g., font names, sizes, effects, etc.), color information (e.g., RGB color values, hexadecimal color codes, etc.) and text information for the landing resource. The DOM tree may include data assets that are not directly visible in the snapshot image (e.g., metadata, hyperlink URLs, object attributes, etc.). Resource renderer 110 may generate a rendered representation of the landing resource including all of the data assets of the landing resource. The data assets may be provided to content generation system 114 as nodes of the DOM tree and/or features of the snapshot image.

In various implementations, resource renderer 110 may be part of content generation system 114, client devices 108, or a separate component. Resource renderer 110 may prepare the snapshot image and/or DOM tree in response to a rendering request from content generation system 114. Resource renderer 110 may transmit the snapshot image and/or DOM tree to content generation system 114 in response to the rendering request.

Still referring to FIG. 1, computer system 100 is shown to include data storage devices 112. Data storage devices 112 may be any type of memory device capable of storing profile data, content item data, accounting data, or any other type of data used by content generation system 114 or another component of computer system 100. Data storage devices 112 may include any type of non-volatile memory, media, or memory devices. For example, data storage devices 112 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks.

In some implementations, data storage devices 112 are local to content generation system 114, resources 106, or content requestors 104. In other implementations, data storage devices 112 are remote data storage devices connected with content generation system 114 and/or content requestors 104 via network 102. In some implementations, data storage devices 112 are part of a data storage server or system capable of receiving and responding to queries from content generation system 114 and/or content requestors 104.

In some implementations, data storage devices 112 store data assets extracted from resources 106. For example, data storage devices 112 may store image data for various images displayed on resources 106. Image data may include actual images (e.g., image files), URL locations of images, image attributes, image metadata, or other attributes of the images displayed on resources 106. Data storage devices 112 may store text data, color data, style data, video data, layout data, classification data, and/or other types of data extracted from resources 106 or obtained from other data sources. Data assets may be stored in data storage devices 112 in conjunction with a resource identifier. The resource identifier may indicate a resource from which the data assets were extracted or a resource to which the data assets pertain.

In some implementations, data storage devices 112 store associations between landing resources and secondary resources (e.g., in a database, in a data table, etc.). Content generation system 114 may access data storage devices 112 to identify a secondary resource associated with a specified landing resource. Data storage devices 112 may store the URL of a specific social networking resource (e.g., a Google+ page) associated with a specified landing resource. In some implementations, data storage devices 112 store branding information associated with resources 106. Data storage devices 112 may store a knowledge base including semantic information gathered from a wide variety of sources (e.g., Google Knowledge Graph). The knowledge base may provide structured and detailed information about various landing resources in addition to a list of links to other resources related to the landing resources.

Data storage devices 112 may store previous content items that have been used in conjunction with content requestors 104. Previous content items may include content items provided by content requestors 104, content items created by content generation system 114 for content requestors 104, images previously used or approved by content requestors 104, and/or other components of previously generated content items. Data storage devices 112 may be an image repository for on page images extracted from resources 106, images previously used or approved by content requestors 104, and/or other images that have not been extracted from resources 106 or approved by content requestors 104.

In some implementations, data storage devices 112 store event data, statistical data, or performance data relating to the content items served to client devices 108. The event data may include an indication of a serving context (e.g., device type, platform, etc.) and an indication of one or more attributes of the served content items (e.g., click type, creative extension, etc.), and/or user behaviors with respect to the served content items (e.g., clicks, conversions, etc.). The statistical data may include statistics based on the event data (e.g., a total number of clicks, a total number of conversions) for various content items or groups of content items. The statistical data may describe the performance of content items having a particular feature or set of features in a given serving context. The performance data may include performance metrics (e.g., CTR) calculated based on the event data and/or statistical data for the content items or groups of content items.

Still referring to FIG. 1, computer system 100 is shown to include a content generation system 114. Content generation system 114 may be configured to extract data assets (e.g., images, colors, texts, fonts, styles, etc.) from resources 106. Content generation system 114 may process the extracted data assets to generate additional data assets (e.g., generating call-to-action text based on webpage classification) and/or to identify secondary resources from which additional data assets can be obtained. Content generation system 114 may process the extracted data assets (e.g., cropping images, identifying high contrast color schemes, creating text snippets from extracted text, etc.) and select various data assets for use in the generated content item.

Content generation system 114 may create a content item that includes the selected data assets. In some implementations, content generation system 114 creates content items in a variety of different formats (e.g., video, display, text, etc.) and scores the content items in each format. Content generation system 114 may provide the highest scoring content items to content requestors 104 for approval and/or store the content items for subsequent delivery to client devices 108. Content generation system 114 is described in greater detail with reference to FIGS. 2-7.

Figure 2:
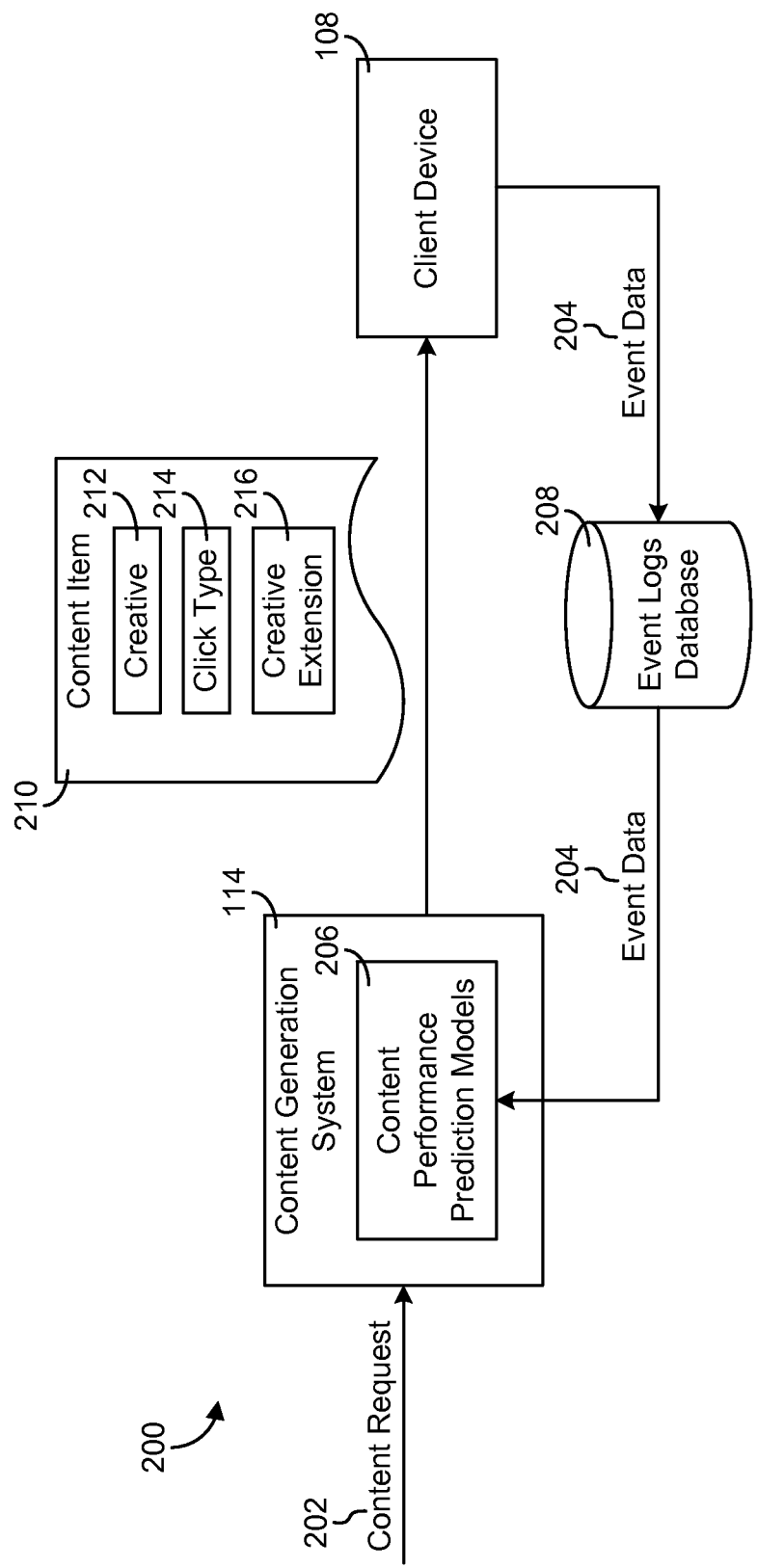
FIG. 2 is a block diagram illustrating the content generation system of FIG. 1 using feedback from a client device to train predictive models for content performance optimization, according to a described implementation.

Referring now to FIG. 2, a closed loop system 200 for optimizing content performance is shown, according to a described implementation. System 200 is shown to include content generation system 114 and a client device 108. Content generation system 114 may receive a content request 202 from a remote system or device. In various implementations, content request 202 may be received from content requestors 104, from a content server, a real-time bidding system, or from client device 108. Content request 202 may be received from client device 108 as part of an online content serving process (e.g., a request for an advertisement for display on a webpage). Content request 202 may include an indication of a particular serving context such as a device type, a platform, a location of the device on which the content will be presented, a current time, an interest category associated with the client device, an ID or category of a resource in conjunction with which the content will be presented, or other attributes of a particular impression and/or serving context.

Content generation system 114 is shown receiving event data 204 from an event logs database 208. In various implementations, event data 204 may be received from event logs database 208, from a log file processing system, or directly from client device 108. Event data 204 may describe the behavior of client device 108 with respect to content items that have been previously served to client device 108. Content generation system 114 may use event data 204 to train one or more content performance prediction models 206. Content performance prediction models 206 may be configured to predict the performance of a feature or combination of features that could potentially be included in a generated content item for the given serving context.

Content generation system 114 may use prediction models 206 to select a particular feature or combination of features that are estimated to result in optimal content performance (e.g., features that maximize a performance metric such as pCTR). In some implementations, content generation system 114 uses prediction models 206 to generate or select a creative 212, a click type 214, and/or a creative extension 206. Generating creative 212 may include extracting data assets from a landing resource and using a selection of the data assets to generate a creative that is tailored to the landing resource. Creative generation is described in greater detail with reference to FIGS. 4-5.

Selecting a click type 214 may include using prediction models 206 to calculate an estimated performance metric (e.g., pCTR) for content items having various click type attributes (e.g., a button click type, a whole content item click type, a confirmation click type, etc.). Content generation system 114 may select a click type 214 from a multiple potential click types based on the estimated performance metrics. In some implementations, content generation system 114 selects a click type 214 that optimizes the calculated performance metric for a particular serving context.

Selecting a creative extension 216 may include determining which of a plurality of creative extensions (e.g., a click-to-call button, a location button, a secondary resource button, etc.) are available for content request 202. The availability of creative extensions 216 may vary based on the content request 202 and the particular serving context. For example, a click-to-call button may be available if client device 108 is a mobile device (e.g., a smart phone) but unavailable if client device 108 is a desktop client. Content generation system 114 may generate creative extensions using information (e.g., business contact information, business location, etc.) extracted from the landing resource for the content item and/or other databases.

Content generation system 114 may generate a content item 210 having the features selected for content performance optimization. Content item 210 is shown to include the selected creative 212, the selected click type 214, and the selected creative extension 216. Content generation system 114 may deliver content item 210 to client device 108 for presentation to a user. User actions with respect to content item 210 may generate event data 204, which is stored in event logs database 208 for use in further training prediction models 206.

Closed loop system 200 allows event data 204 to be used as feedback for training and/or updating predictive models 206. Using event data 204 to train predictive models 206 may improve prediction accuracy and may allow predictive models 206 to be updated (e.g., at regular intervals or continuously) as new events are logged.

Figure 3:
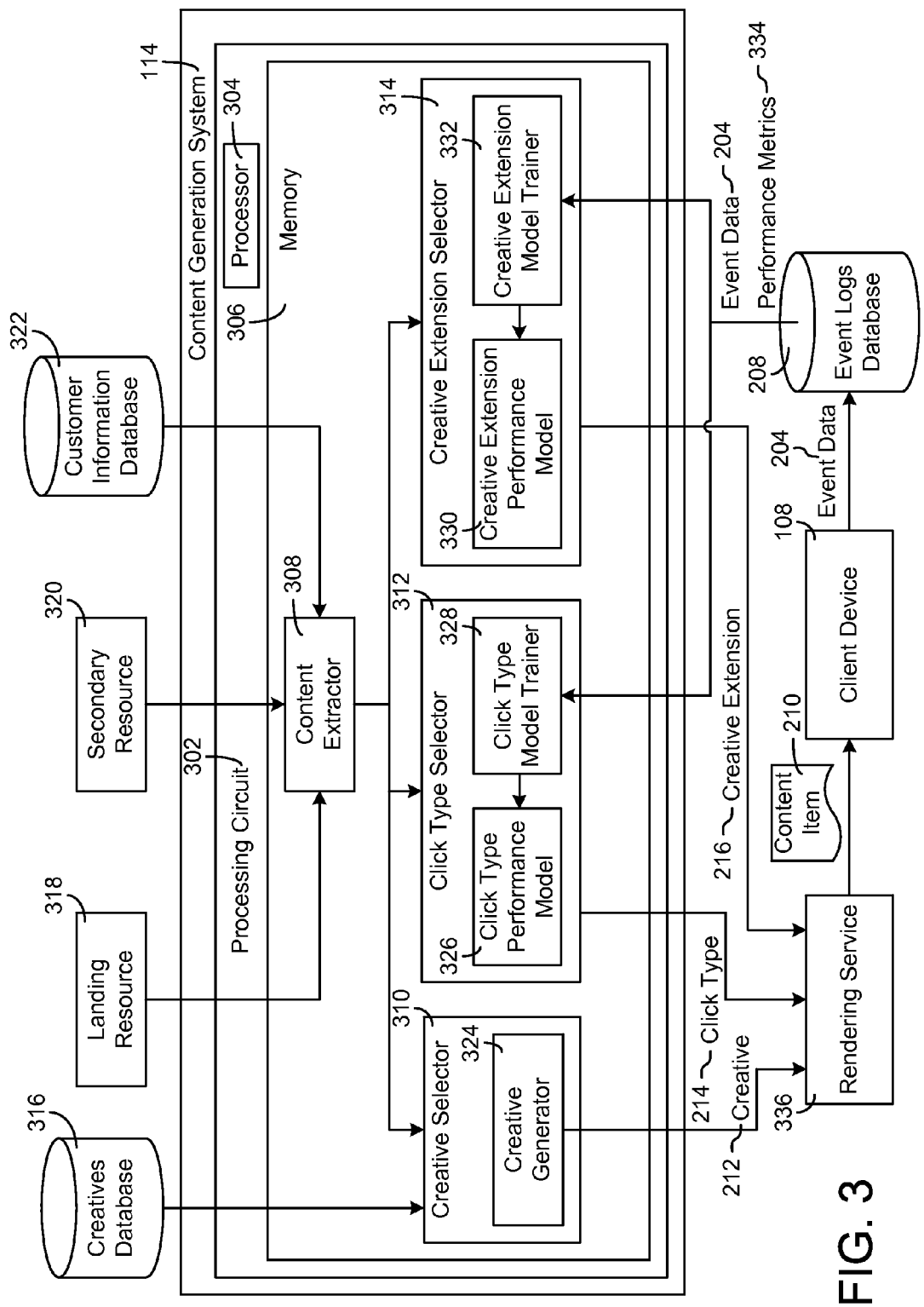
FIG. 3 is a block diagram illustrating several components of the content generation system of FIG. 1, including a content extractor, a creative selector, a click type selector, and a creative extension selector, according to a described implementation.

Referring now to FIG. 3, content generation system 114 is shown in greater detail, according to a described implementation. Content generation system 114 is shown to include a processing circuit 302 having a processor 304 and memory 306. Processor 304 may be implemented as a general purpose processor, an application specific integrated circuit (ASIC), one or more field programmable gate arrays (FPGAs), a CPU, a GPU, a group of processing components, or other suitable electronic processing components.

Memory 306 may include one or more devices (e.g., RAM, ROM, flash memory, hard disk storage, etc.) for storing data and/or computer code for completing and/or facilitating the various processes, layers, and modules described in the present disclosure. Memory 306 may include volatile memory or non-volatile memory. Memory 306 may include database components, object code components, script components, or any other type of information structure for supporting the various activities and information structures described in the present disclosure. In some implementations, memory 306 is communicably connected to processor 304 via processing circuit 302 and includes computer code (e.g., data modules stored in memory 306) for executing one or more processes described herein.

Still referring to FIG. 3, memory 306 is shown to include a content extractor 308, a creative selector 310, a click type selector 312, and a creative extension selector 314. Content extractor 308 and selectors 310-314 may be modules of content generation system 114 (e.g., within memory 306). In various implementations, content generation system 114 may be a single system or device (as shown in FIG. 3) or distributed across multiple systems or devices. In a distributed implementation, the functions of content extractor 308, creative selector 310, click type selector 312, and creative extension selector 314 may be performed by multiple different systems or devices configured to communicate via network 102.

In some implementations, content extractor 308 is configured to run once per creative. Content extractor 308 may identify and extract information that can be used to select or generate a creative (e.g., by creative selector 310) or a creative extension (e.g., by creative extension selector 314). Content extractor 308 may be run prior to serving time to build a library of data assets and/or information that can later be selected for inclusion in content item 210. The content extracted by content extractor 308 may determine which types of creative extensions are available for selection. Click type selector 312 and creative extension selector 314 may be run at serving time (i.e., in response to content request 202) to select an optimal click type and/or creative extension to include in generated content item 210. Click type selector 312 and creative extension selector 314 may select a click type and a creative extension based primarily on the serving context.

Content extractor 308 may be configured to extract data assets from various data sources for use in generating content item 210. The resources from which the data assets are extracted may be defined by the identity of the landing resource. Extracted data assets may include images, colors, fonts, text, graphics, videos, styles, business-related information (e.g., geographic location, contact information, etc.), page classification, and/or other types of data related to landing resource 318.

Content extractor 308 may extract data assets from landing resource 318, a secondary resource 320 associated with landing resource 318, and/or a customer information database 322. In some implementations, landing resource 318 is one of resources 106. Landing resource 318 may be defined as the resource to which client device 108 is directed by content item 210. Secondary resource 320 may be any type of resource (e.g., webpages, websites, word processing documents, videos, PDF documents, etc.) and may be associated with landing resource 318. In some implementations, secondary resource 320 is a social networking resource such as a Google+ page associated with landing resource 318.

Customer information database 322 may store various types of information relating to landing resource 318 and/or content requestors 104. For example, customer information database 322 may provide information that can be used to generate creative extensions for inclusion in content item 210. In some implementations, customer information database 322 stores business-related information such as business contact information (e.g., a phone number, an email address, etc.), geographic location of the business, a type of good or service provided by the business, a business classification, or other types of information that can be included in content item 210.

In some implementations, content extractor 308 includes a resource rendered configured to generate a rendered representation of landing resource 318 and/or secondary resource 320. The rendered representation may be a document object model (DOM) tree or a snapshot image identifying the various data assets extracted by content extractor 308. Content extractor 308 is described in greater detail with reference to FIG. 4.

Still referring to FIG. 3, the data assets extracted by content extractor 308 may be provided to creative selector 310, click type selector 312, and creative extension selector 314. Creative selector 310 may be configured to select or generate a creative 212 for use in content item 210. In various implementations, creative selector 310 selects a previously-generated creative from a creatives database 316 or generates a new creative using creative generator 324. Creative generator 324 may use the data assets extracted by content extractor 308 and/or the serving context provided by content request 202 to generate a creative that is customized to landing resource 318 for presentation on client device 108. Creative generator 324 is described in greater detail with reference to FIG. 5.

Still referring to FIG. 3, memory 306 is shown to include a click type selector 312. Click type selector 312 may be configured to select a click type 214 for use in content item 210. Click type 214 may be an attribute of content item 210 or a snippet of code embedded in content item 210. Click type 214 may affect the layout of content item 210, the interactivity of content item 210, and/or the manner in which content item 210 is rendered or presented by client device 108. In some implementations, click type 214 defines the types of user actions that qualify as a "click" for purposes of billing content providers and calculating performance metrics such as CTR. Click type selector 312 may select click type 214 from multiple potential click types including a "button" click type, a "whole content item" click type, and a "confirmation" click type.

The button click type may define a click as a user interaction with a specific portion of content item 210 such as a clickable button or other subset of the total area of content item 210. If content item 210 has the button click type, user interactions with other portions of content item 210 (e.g., portions outside the clickable area) may not cause client device 108 to navigate to landing resource 318 and may not qualify as clicks for purposes of billing and/or performance metric calculation.

The whole content item click type may define a click as a user interaction with any portion of content item 210. If content item 210 has the whole content item click type, user interactions with any portion of content item 210 may cause client device 108 to navigate to landing resource 318 and may qualify as clicks for purposes of billing and/or performance metric calculation.

The confirmation click type may cause content item 210 to display a confirmation prompt in response to a first user interaction therewith (e.g., a first click). The confirmation prompt may display a message instructing the user to click again to navigate to landing resource 318. If content item 210 has the confirmation click type, a second user interaction with content item 210 (e.g., a second click) may cause client device 108 to navigate to landing resource 318 and may qualify as a click for purposes of billing and/or performance metric calculation. The confirmation click type may be useful to protect against inadvertent clicks that are not likely to result in a conversion.

Still referring to FIG. 3, click type selector 312 is shown to include a click type performance model 326 and a click type model trainer 328. Click type performance model 326 may be configured to predict the performance of content item 210 for each of the potential click types that can be selected by click type selector 312, based on the serving context of content item 210.

Click type performance model 326 may be configured to receive inputs such as landing resource ID (e.g., a URL) or type (e.g., a page classification), a device type (e.g., mobile, tablet, desktop, etc.), a content platform (e.g., video, text, image, etc.), a device location, user interests, or other information describing a particular serving context. Click type selector 312 may use click type performance model 326 to calculate a predicted performance metric (e.g., pCTR) for various click types based on the serving context of content item 210. Click type selector 312 may select a click type 214 based on the predicted performance metrics for various click types.

Click type model trainer 328 may be configured to access event logs database 208 to retrieve event data 204 and/or performance metrics 334. Event data 204 and performance metrics 334 may describe the performance of content items that were previously served to client device 108 (or other client devices). Click type model trainer 328 may use the data from event logs database 208 to train and/or update click type performance model 326 to ensure that click type performance model 326 provides click type selector 312 with an accurate prediction of content performance for various click types. Click type selector 312 is described in greater detail with reference to FIG. 6.

Still referring to FIG. 3, memory 306 is shown to include a creative extension selector 314. Creative extension selector 314 may be configured to select a creative extension 216 for use in content item 210. Creative extension 216 may be a supplemental element of content item 210 in addition to the primary creative 212. Creative extension selector 314 may select creative extension 314 from multiple potential creative extensions based on the serving context for content item 210 and/or the data assets extracted by content extractor 308. In some implementations, potential creative extensions include clickable buttons such as a "click-to-call" button, a "location" button, a "secondary resource" button, and/or other types of supplemental content that can be included in the content item.

The click-to-call button may be available for selection if the serving context for content item 210 indicates that content item 210 will be presented a mobile communications device. In some implementations, the click-to-call button may be available for selection if a telephone number or other contact information is extracted by content extractor 308. Contact information may be automatically extracted by content extractor 308 from landing resource 318 or from customer information database 322. Selecting the click-to-call button may initiate a telephone call or other communication with the entity associated with the content item (e.g., a retail store, a customer service line, a sales representative, etc.). For other device types (e.g., a desktop computer, a tablet, etc.) a "click-to-email" button or more general "click-to-contact" button may be included in place of the click-to-call button when contact information is known.

The location button may be available for selection when a geographic location (e.g., street address, store location, mailing address, GPS coordinates, etc.) is extracted by content extractor 308 or when the location of client device 108 is known. Selecting the location button may cause a map depicting the extracted geographic location to be displayed. If the serving context indicates that content item 210 will be presented on a mobile device, selecting the location button may cause a maps application or navigation application to be loaded. In some implementations, selecting the location button causes client device 108 to navigate to a maps resource (e.g., Google Maps).

The secondary resource button may be available for selection when the identity of secondary resource 320 is known. Selecting the secondary resource button may cause client device 108 to navigate to secondary resource 320. Content item 210 may include creative extensions (e.g., selectable buttons or links) for multiple different resources or portions of a resource (e.g., secondary resource 320, a social resource, landing resource 318, etc.). In some implementations, content item 210 links only to secondary resource 320 (and not landing resource 318) and may be referred to as a social content item. In other implementations, content item 210 links to both landing resource 318 and secondary resource 320.

Still referring to FIG. 3, creative extension selector 314 is shown to include a creative extension performance model 330 and a creative extension model trainer 332. Creative extension performance model 330 may be configured to predict the performance of content item 210 for each of the available creative extensions or combinations of creative extensions that can be selected by creative extension selector 314, based on the serving context of content item 210.

Creative extension performance model 330 may be configured to receive inputs such as landing resource ID (e.g., a URL) or type (e.g., a page classification), a device type (e.g., mobile, tablet, desktop, etc.), a content platform (e.g., video, text, image, etc.), a device location, user interests, or other information describing a particular serving context. Creative extension selector 314 may use creative extension performance model 330 to calculate a predicted performance metric (e.g., pCTR) for various types of creative extensions based on the serving context of content item 210. Creative extension selector 314 may select a creative extension or combination of creative extensions for content item 210 based on the predicted performance metrics.

Creative extension model trainer 332 may be configured to access event logs database 208 to retrieve event data 204 and/or performance metrics 334. Event data 204 and performance metrics 334 may describe the performance of content items that were previously served to client device 108 (or other client devices). Creative extension model trainer 332 may use the data from event logs database 208 to train and/or update creative extension performance model 330 to ensure that creative extension performance model 330 provides creative extension selector 314 with an accurate prediction of content performance for various types of creative extensions. Creative extension selector 314 is described in greater detail with reference to FIG. 7.

Figure 4:
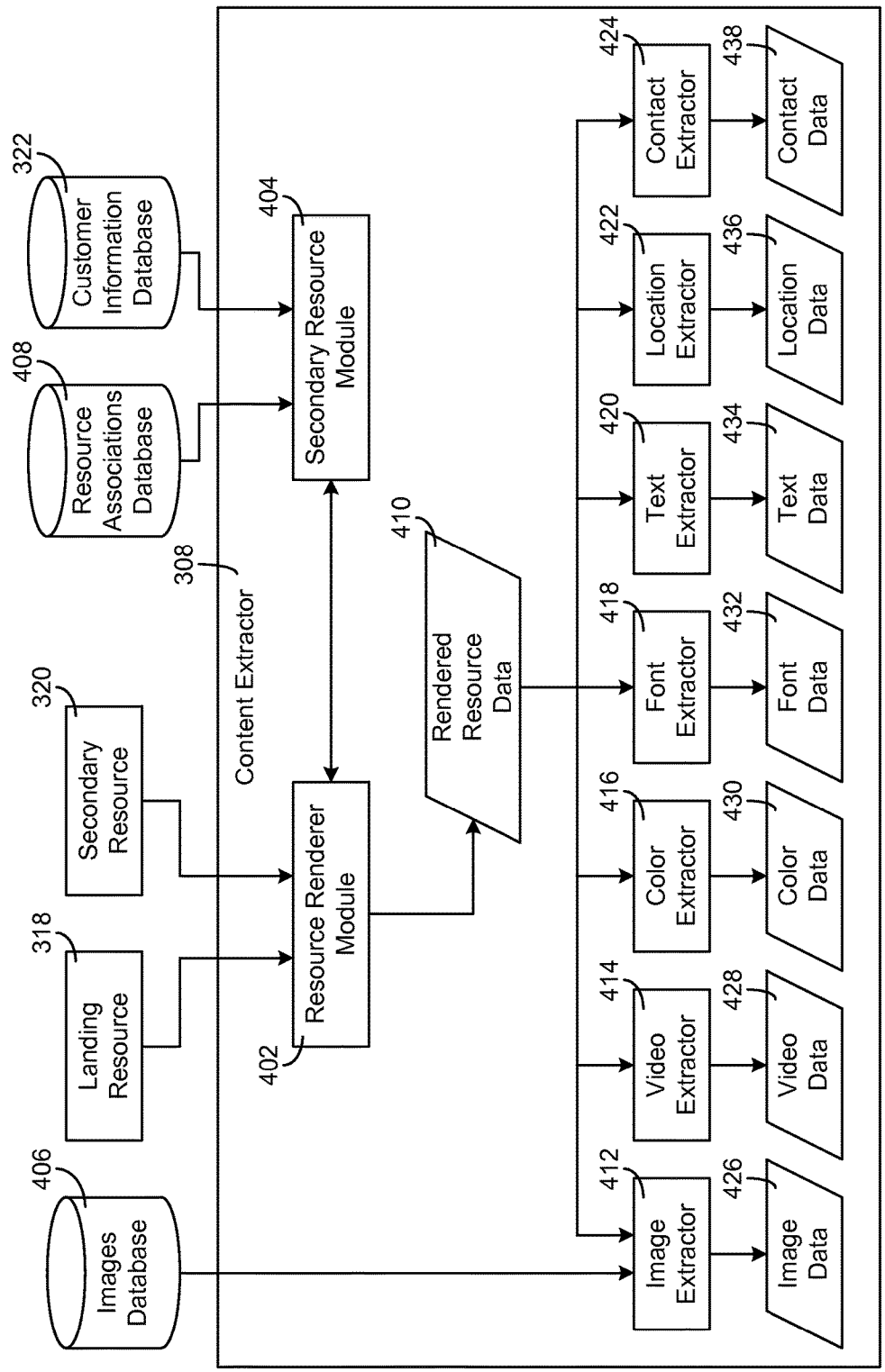
FIG. 4 is a block diagram illustrating the content extractor of FIG. 3 in greater detail, according to a described implementation.

Referring now to FIG. 4, content extractor 308 is shown in greater detail, according to a described implementation. Content extractor 308 is shown to include a resource renderer module 402. In some implementations, resource rendering is performed by resource renderer module 402 rather than an external resource rendering service (e.g., resource renderer 110). Resource renderer module 402 may include the functionality of resource renderer 110 as described with reference to FIG. 1. For example, resource renderer module 402 may be capable of interpreting resources 106 and creating a representation (e.g., an image, a display, etc.) thereof.

Resource renderer module 402 may identify a specific landing resource using a URL or other indicator provided by content request 202 as part of a request to generate content items. Resource renderer module 402 may read and interpret marked up content (e.g., HTML, XML, image URLs, etc.) and formatting information (e.g., CSS, XSL, etc.) from landing resource 318 and secondary resource 320 and render resources 318-320 (e.g., according to W3C standards). Resource renderer module 402 may create a snapshot image of resources 318-320 and/or construct a DOM tree representing resources 318-320.

The snapshot image may be a visual representation of a resource. For example, the snapshot image for landing resource 318 may illustrate the visual appearance of landing resource 318 as presented on a user interface device (e.g., an electronic display screen, a computer monitor, a touch-sensitive display, etc.) after rendering landing resource 318. The snapshot image may include color information (e.g., pixel color, brightness, saturation, etc.) and style information (e.g., square corners, rounded edges, modern, rustic, etc.) for landing resource 318. In some implementations, the snapshot image may be an image file having any suitable file extension (e.g. .jpg, .png, .bmp, etc.).

The DOM tree may be a hierarchical model of a resource. For example, the DOM tree for landing resource 318 may include image information (e.g., image URLs, display positions, display sizes, alt text, etc.), font information (e.g., font names, sizes, effects, etc.), color information (e.g., RGB color values, hexadecimal color codes, etc.) and text information for landing resource 318. Resource renderer module 402 may store the snapshot image and/or DOM tree (e.g., in memory 306 or an external database) for subsequent use by other modules content generation system 114. In some implementations, resource renderer module 402 stores the snapshot image and/or the DOM tree as rendered resource data 410.

Still referring to FIG. 4, content extractor 308 is shown to include a secondary resource module 404. Secondary resource module 404 may be configured to identify a secondary resource 320 associated with landing resource 318. In some implementations, secondary resource module 404 accesses a resource associations database 408 to identify one or more secondary resources 320 associated with landing resource 318. Resource associations database 408 may store mappings, links, associations, and/or other connections between different resources (e.g., in the form of a data table, a tabular database, an associative database, etc.). In some implementations, resource associations database 408 stores branding information associated with resources 318-320. Resource associations database 408 may store semantic information and/or detailed information about various landing resources and may include a list of links to other resources related to the landing resources. In some implementations, resource associations database 408 stores an association between landing resource 318 and a social networking resource (e.g., a Google+ page) associated therewith.

In some implementations, secondary resource module 404 identifies secondary resource 320 using information extracted from landing resource 318. For example, landing resource 318 may include a link, a textual description, metadata, and/or another indication of a particular secondary resource 320. Secondary resource module 404 may authenticate secondary resource 320 to determine whether secondary resource 320 is associated with the same entity as landing resource 318 (e.g., owned, operated, or maintained by the same entity as landing resource 318) or whether secondary resource 320 is associated with a different entity than landing resource 318 (e.g., a fan page, an imitation, etc.).

Secondary resource module 404 may be configured to determine a quality of secondary resource 320. If secondary resource 320 is a social networking resource, secondary resource module 404 may determine quality based on a number of connections to other social networking resources (e.g., a number of followers, a number of links, number of subscribers, etc.). In some implementations, secondary resource module 404 determines the quality of secondary resource 320 by the popularity thereof (e.g., number of visits, number of views, etc.). Secondary resource module 404 may rank or score multiple secondary resources associated with landing resource 318 and provide an indication of one or more top scoring secondary resources to resource renderer module 402.

Resource renderer module 402 may generate a rendered representation of secondary resource 320 and store the rendered data in rendered resource data 410. In some implementations, resource renderer module 402 extracts and stores secondary resource data from secondary resource 320. Secondary resource data may include any type information that is obtained from secondary resource 320. Secondary resource data may include a business classification, business contact information (e.g., a business phone number, a business email, etc.), a geographic location of the business, a type of good or service provided by the business, images, text, colors, styles, and/or other types of information that can be extracted from secondary resource 320.

Still referring to FIG. 4, content extractor 308 is shown providing rendered resource data 410 to various extractor modules 412-424. Each of extractor modules 412-424 may be configured to extract a different type of data from rendered resource data 410. For example, image extractor 412 may be configured to extract image data assets 426, video extractor 414 may be configured to extract video data assets 428, color extractor 416 may be configured to extract color data assets 430, font extractor 418 may be configured to extract font data assets 432, text extractor 420 may be configured to extract text data assets 434, location extractor 422 may be configured to extract location data assets 436 (e.g., addresses, GPS coordinates, etc.), and contact extractor 424 may be configured to extract contact data assets 438 (e.g., telephone numbers, email addresses, etc.). Data assets 426-438 may be stored in memory 306 or a separate database for use in generating creative 212 and/or creative extension 216.

Figure 5:
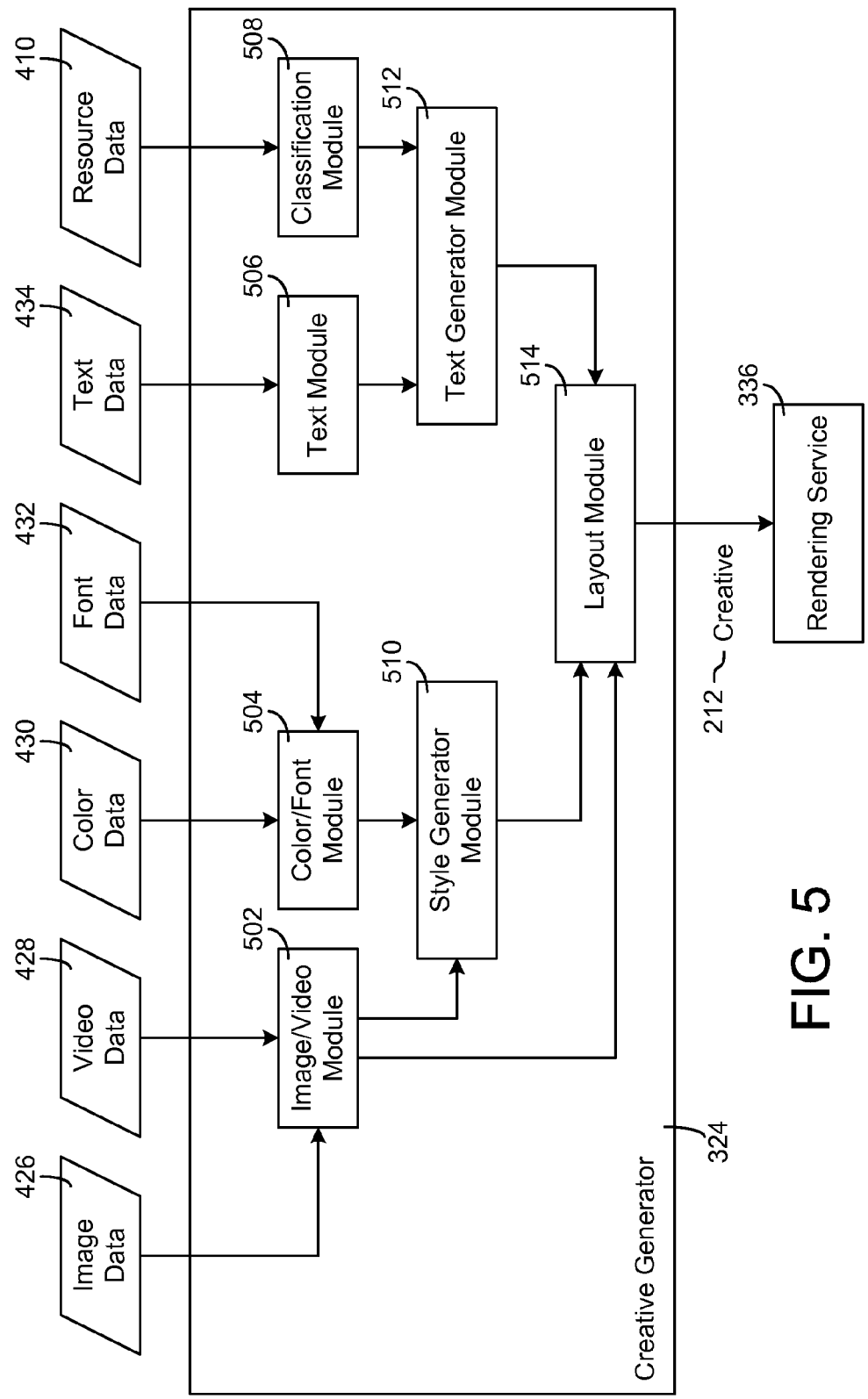
FIG. 5 is a block diagram illustrating a creative generator that may be used by the creative selector of FIG. 3 to automatically generate a creative using extracted data assets, according to a described implementation.

Referring now to FIG. 5, creative generator 324 is shown in greater detail, according to an exemplary embodiment. Creative generator 324 may use the data assets 426-438 extracted by content extractor 308 to generate a creative that is customized to landing resource 318. Creative selector 310 may select a creative 212 from multiple potential creative generated by creative generator 324. In other implementations, creative selector 310 may select creative 212 from a database of creatives (i.e., creatives database 316) that have previously been generated or provided by a content provider.

Creative generator 324 is shown to include an image/video module 502. Image/video module 502 may analyze the extracted image data assets 426 to detect the visual content of the images. Detecting visual content may include, determining a location of a salient object represented in an image, determining a location of text in the image, and/or determining whether the image can be cropped or processed to improve the visual impact of the image. In some implementations, image/video module 502 analyzes the extracted images to detect the semantic content of the images. Detecting semantic content may include identifying an object depicted in an image or a meaning conveyed by an image. Image/video module 502 may assign one or more labels or keywords to an image describing the semantic content thereof. The labels and/or keywords can be used to determine a relevancy of the image to a particular third-party content item.

Image/video module 502 may process the images to prepare the images for use in a third-party content item. Image processing may include cropping the images to emphasize salient objects or to remove text, resizing the images, formatting the images, or otherwise adjusting the images. In some implementations, image/video module 502 identifies and enhances logo images.

Image/video module 502 may filter and rank images based on various attributes of the images. Image/video module 502 may determine a quality score and/or on-page salience score for each of the images. The quality score for an image may indicate an aesthetic appearance of the image based on various image attributes. The salience score may indicate a prominence with which an extracted image is displayed on landing resource. Image/video module 502 may discard or filter images that have a display size less than a threshold display size or a quality score less than a threshold quality score. In some implementations, image/video module 502 ranks the images based on the salience scores associated with the images. Image/video module 502 may select the top ranking image or images for inclusion in a display content item.

Image/video module 502 may analyze and process the extracted video data assets 428 using similar processing steps as applied to the image data assets 426. In some implementations, image/video module 502 combines a plurality of extracted images into a video file or a video slideshow.

Still referring to FIG. 5, creative generator 324 is shown to include a color/font module 504. color/font module 504 may receive color data assets 430 (e.g., background colors, image colors, font colors, text colors, etc.), font data assets 432 (e.g., font faces, font sizes, etc.), and other types of stylistic information extracted by content extractor 308. In some implementations, color/font module 504 selects colors for the background, headline, description, button background, and/or button text of the generated content item. Color/font module 504 may identify and use the colors displayed on landing resource 318, secondary resource 320, or a combination thereof. Color/font module 504 may use the snapshot image and/or DOM tree of landing resource to select colors for the content item. In some implementations, color/font module 504 identifies color clusters from the snapshot image using a clustering technique (e.g., k-means clustering).

Color/font module 504 may select a font or font family for use in the generated content item. In some implementations, font data assets 432 may include font information as HTML, CSS, or XML font tags. Color/font module 504 may use font data assets 432 to identify and select one or more fonts (e.g., font faces, font families, etc.).

In some implementations, color/font module 504 separates the extracted fonts into multiple categories based on font size. For example, color/font module 504 may create a first category for large fonts (e.g., greater than 20 pt., greater than 16 pt., etc.) and a second category for relatively smaller fonts. In some implementations, color/font module 504 identifies multiple fonts or font families for use in the generated content item. For example, color/font module 504 may identify a first font to use as a headline font for the generated content item and a second font to use as a font for a descriptive portion or button text of the content item. Color/font module 504 may provide the extracted colors and fonts to style generator module 510 for use in generating a style (e.g., color scheme, font scheme, etc.) for the generated content item 210.

Still referring to FIG. 5, creative generator 324 is shown to include a text module 506. Text module 506 may receive text data assets 434 and use the text data assets 434 to select headline text, descriptive text, on page metadata, on page titles, image captions, and other types of text for use in the generated content item. In some implementations, text module 506 uses text data assets 434 to create a summary of the text displayed on landing resource 318.

In some implementations, text module 506 retrieves textual data from other data sources in addition to or in place of landing resource 318. For example, text module 506 may receive textual data from user-created reviews of a business, product, or service. The reviews may be retrieved from an Internet resource (e.g., website) on which users are permitted to post or submit comments, reviews, or other text related to a particular business, product, or service. The URL of landing resource 318 may be used to specify the location of such reviews and/or direct text module 506 to a particular resource.

Text module 506 may include a sentiment detection system capable of determining whether a review is positive or negative with or without a numerically expressed rating (e.g., "1 out of 5," "4 stars," etc.). The sentiment detection system may parse the language of the review, looking for positive-indicating adjectives (e.g., excellent, good, great, fantastic, etc.). The sentiment detection system may then select or extract a relatively short snippet of the review that includes such positive phrases for inclusion in content item 210.

Still referring to FIG. 5, creative generator 324 is shown to include a classification module 508. In some implementations, classification module 508 uses resource data 410 to classify or categorize landing resource 318. In other implementations, classification module 508 may access a categories database (e.g., customer information database 322 or resource associations database 408) to obtain category for landing resource 318 (e.g., based on the URL of landing resource 318). The categories database may specify a category of business associated with landing resource 318 (e.g., fast food, automotive parts, etc.) as well as other attributes of the associated business. The category of landing resource 318 may be used by text generator module 512 to generate call-to-action text for generated content item 210.

Classification module 508 may use data from secondary resource 320 to determine the classification of landing resource 318. For example, if secondary resource 320 is a social networking resource such as a Google+ profile, secondary resource 320 may include classification information provided by the same entity associated with landing resource 318. Classification module 508 may use the classification information from secondary resource 320 to determine whether landing resource 318 is created for branding or local business. User-provided classification information may provide more detailed accurate categories than other sources of classification information and may advantageously be used by classification module 508 to refine the classification of landing resource 318.

Still referring to FIG. 2, creative generator 324 is shown to include a style generator module 510. Style generator module 510 may be configured to generate a color scheme and/or a font scheme for the generated content item 210. Style generator module 510 may use the colors extracted by color/font module 504 to generate a color scheme for the automatically-generated content item. Style generator module 510 may select a color for a background color, button color, headline color, description color, button text color, or other portions of the generated content item. Style generator module 510 may determine the saturation, brightness, noticeability, and/or other attributes of each extracted color as well as the contrast between each of the extracted colors.

In some implementations, style generator module 510 selects the most dominant color (e.g., heaviest weighted, highest dominance ranking, etc.) extracted by color/font module 504 as the background color for the content item. Style generator module 510 may select the extracted color with the highest multiplied saturation and weight as the button color for the content item. Style generator module 510 may select the colors with the highest contrast and/or brightness differences with the selected background color as the colors for the headline and description text. If more than two colors are available, style generator module 510 may select the more noticeable color as the headline color.

In other implementations, style generator module 510 selects a predefined color scheme for content item 210. The predefined color scheme may be used to select the background color, button color, headline color, description color, button text color, or other portions of the generated content item rather than directly applying the colors extracted by color/font module 504. The predefined color scheme may be a combination of colors previously assembled into a color template or color group. In some implementations, the predefined color scheme may be selected from a set of predefined color schemes based on the colors extracted by color/font module 504. For example, style generator module 510 may compare the colors extracted by color/font module 504 with the colors included in a plurality of predefined color schemes. Style generator module 510 may rank the predefined color schemes based on the differences (e.g., RGB values, saturation, brightness, contrast, etc.) between one or more of the colors extracted by color/font module 504 and one or more of the colors included in the predefined color scheme. Colors from a predefined color scheme may supplement or replace colors identified by color/font module 504 in the automatically-generated content item.

In some implementations, style generator module 510 selects a color scheme that enhances the readability of images and/or text. If an image is displayed in the generated content item 210, style generator module 510 may select a background color for the image that provides a high contrast with the colors of the image (e.g., RGB contrast >200). In some implementations, style generator module 510 identifies the original background color of the extracted image. The original background color may be the background color of the image as displayed on the resource from which the image was extracted. Style generator module 510 may use the original background color of the image in the generated content item 210.

In some implementations, style generator module 510 identifies a border within the image that separates the area within the border from the background color. Style generator module 510 may determine a maximum length border such that the contrast (e.g., an average RGB contrast) between the area within the border and the background color exceeds a threshold contrast value (e.g., RGB contrast >200). If the area within the border exceeds a threshold area (e.g., 80% of the image area), style generator module 510 may determine that the color scheme enhances the readability of the image.

Style generator module 510 may select a combination of fonts for use in the generated content item 210. In some implementations, style generator module 510 selects a first font for the headline text and a second font for the descriptive and/or button text. Style generator module 510 may use the fonts extracted from landing resource 318 to select a font combination that closely matches the fonts used in landing resource 318. In this way, style generator module 510 facilitates the generation of content items that have a similar look and feel to landing resource 318.

Still referring to FIG. 2, creative generator 324 is shown to include a text generator module 512. Text generator module 512 may be configured to generate a textual portion of content item 210. Text generator module 512 may generate headline text, descriptive text, button text, call-to-action text, mouse-over text, metadata text, and/or other types of text for inclusion in content item 210.

Text generator module 512 is shown receiving inputs from classification module 508 and text module 506. Text generator module 512 may use the category of landing resource 318 determined by classification module 508 to generate call-to-action text that is tailored for a particular category of landing resource 318. For example, if landing resource 318 relates to the category of games, text generator module 512 may generate call-to-action text such as "play now" or "try it now." If landing resource 318 relates to a subscription service, text generator module 512 may generate call-to-action text such as "sign up now" or "enroll now."

In some implementations, text generator module 512 identifies a text snippet (e.g., phrase, text string, portion, etc.) for use in the generated content item 210. The text snippet may be a portion of the text displayed on landing resource 318, secondary resource 320, or other text not displayed on resources 106 (e.g., metadata text). Text generator module 512 may process various types of extracted text to identify a short portion (e.g., less than a threshold number of words, characters, or sentences) that can be used as descriptive text or headline text in the generated content item 210. Text generator module 512 may highlight or emphasize (e.g., bold, underline, italicize, increase in font size, etc.) important features of the text such as a price or date.

In some implementations, text generator module 512 uses text extracted from user reviews of the business, product, or service associated with landing resource 318. Text generator module 512 may select a portion of a user review which, when read in isolation, effectively communicates why the user who submitted the review had a positive experience with the reviewed business, product, or service. The snippet may include one or more positive adjectives used by text module 216 in identifying a sentiment associated with the review. For example, text generator module 512 may select the snippet "excellent pasta and speedy service" from a relatively lengthy review of an Italian restaurant. In some implementations, the text snippets identified by text generator module 512 may be presented to a content requestors 104 as potential "creatives" (e.g., descriptive text) for use in purely-textual content items. In other implementations, the text snippets may be used as a textual portion of one or more display content items generated by content generation system 114.

Still referring to FIG. 2, creative generator 324 is shown to include a layout module 514. Layout module 514 may be configured to use the extracted and/or processed data to generate a layout for content item 210. In some implementations, layout module 514 generates a creative 212 for content item 210 and may be referred to as a creative builder. Layout module 514 may select a layout from a set of predefined layout options (e.g., template layouts) or generate a new layout (e.g., not based on a template). Layout module 514 may generate a layout based on the display sizes of the images selected by image/video module 502 and/or the length of the text selected by text module 506. Layout module 514 may resize the image(s) and/or adjust the text to fit a selected layout or adjust the layout to fit the selected images and/or text.

In some implementations, layout module 514 uses the data assets extracted from landing resource 318 to determine a style, business category, or appearance for content item 210. For example, layout module 514 may determine a business category of landing resource 318 (e.g., fast food, automotive parts, etc.), a style of landing resource 318 (e.g., modern or rustic), and a usage of shapes (e.g., 90 degree corners, rounded corners, etc.) displayed on landing resource 318. Layout module 514 may invoke an external database to retrieve business category information based on the URL of landing resource 318.

Layout module 514 may assemble various data assets to generate creative 212 and provide creative 212 to a rendering service 336. Rendering service 336 may combine creative 212 with a click type 214 and a creative extension 216 to generate and render content item 210.

Figure 6:
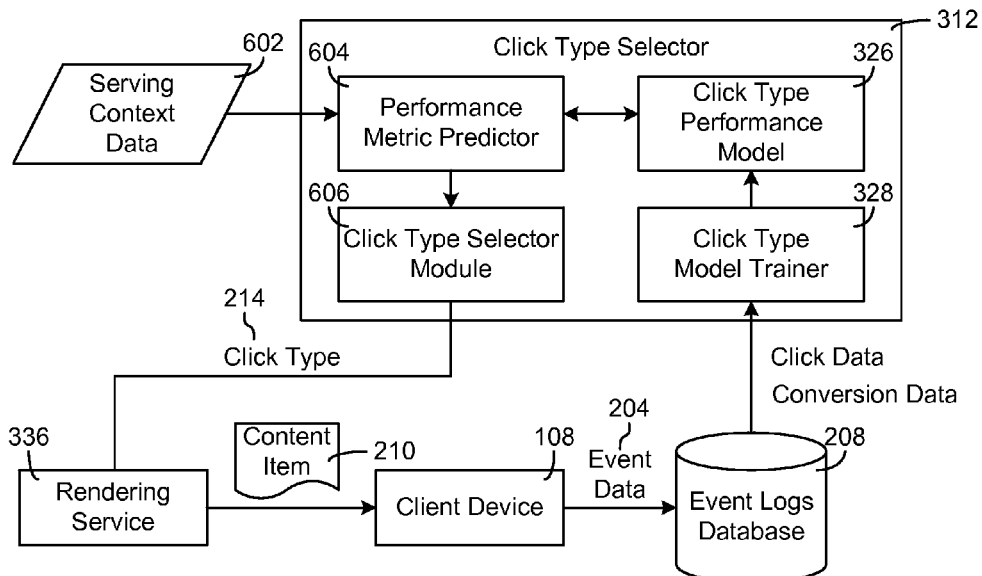
FIG. 6 is a block diagram illustrating the click type selector of FIG. 3 in greater detail, according to a described implementation.

Referring now to FIG. 6, click type selector 312 is shown in greater detail, according to a described implementation. Click type selector 312 may be configured to select a click type 214 for use in content item 210. Click type 214 may be an attribute of content item 210 or a snippet of code embedded in content item 210. Click type 214 may affect the layout of content item 210 (e.g., defining which portions of content item 210 are clickable), the interactivity of content item 210 (e.g., the types of clicks that trigger navigation to landing resource 318), and/or the manner in which content item 210 is rendered or presented by client device 108. In some implementations, click type 214 defines the types of user actions that qualify as a "click" for purposes of billing content providers and calculating performance metrics such as CTR. Click type 214 may define one or more conditions or triggers for causing client device 108 to navigate to landing resource 318.

Click type selector 312 is shown to include a click type model trainer 328. Click type model trainer 328 may be configured to access event logs database 208 to retrieve event data 204. Event data 204 may describe the performance of content items that were previously served to client device 108 in various serving contexts. Event data 204 may include logged user actions such as clicks, conversions, and/or other user behaviors with respect to previously-served content items. Event data 204 may include attributes of the previously-served content items (e.g., click type, creative ID, creative extensions, content type, etc.) and details of the serving context (e.g., device type, device location, content platform, publisher page classification, landing resource ID, etc.). Click type model trainer 328 may use the data from event logs database 208 to train and update click type performance model 326.

Still referring to FIG. 6, click type selector 312 is shown to include a performance metric predictor 604 and a click type performance model 326. Performance metric predictor 604 may provide click type performance model 326 with serving context data 602. Serving context data 602 may be received as part of content request 202 and may describe the context in which content item 210 will be presented. Serving context data 602 may include a landing resource ID (e.g., a URL), a landing resource type (e.g., a page classification), a device type (e.g., mobile, tablet, desktop, etc.), a content platform (e.g., video, text, image, etc.), a device location, a user profile ID associated with content request 202, a creative ID, or other information describing a particular serving context.

Performance metric predictor 604 may use click type performance model 326 to calculate a predicted performance (e.g., pCTR) of content items having various click types for the serving context indicated by serving context data 602. Performance metric predictor 604 may generate a score or ranking for each click type based on the predicted performance of the click type. In some implementations, performance metric predictor 604 predicts the performance of content items having a "button" click type, a "whole content item" click type, and a "confirmation" click type.

The button click type may define a click as a user interaction with a specific portion of content item 210 such as a clickable button or other subset of the total area of content item 210. If content item 210 has the button click type, user interactions with other portions of content item 210 (e.g., portions outside the clickable area) may not cause client device 108 to navigate to landing resource 318 and may not qualify as clicks for purposes of billing and/or performance metric calculation.

The whole content item click type may define a click as a user interaction with any portion of content item 210. If content item 210 has the whole content item click type, user interactions with any portion of content item 210 may cause client device 108 to navigate to landing resource 318 and may qualify as clicks for purposes of billing and/or performance metric calculation.

The confirmation click type may cause content item 210 to display a confirmation prompt in response to a first user interaction therewith (e.g., a first click). The confirmation prompt may display a message instructing the user to click again to navigate to landing resource 318. If content item 210 has the confirmation click type, a second user interaction with content item 210 (e.g., a second click) may cause client device 108 to navigate to landing resource 318 and may qualify as a click for purposes of billing and/or performance metric calculation. The confirmation click type may be useful to protect against inadvertent clicks that are not likely to result in a conversion.

Still referring to FIG. 6, click type selector 312 is shown to include a click type selector module 606. Click type selector module 606 may be configured to select a click type 214 from the multiple different click types for which content performance is predicted by performance metric predictor 604. Click type selector module 606 may consider one or more performance metrics and select a click type that optimizes such performance metrics. Click type selector module 606 may output an indication of a particular click type 214 to rendering service 336. Rendering service 336 may combine click type 214 with creative 212 and creative extension 216 to generate and render content item 210.

Figure 7:
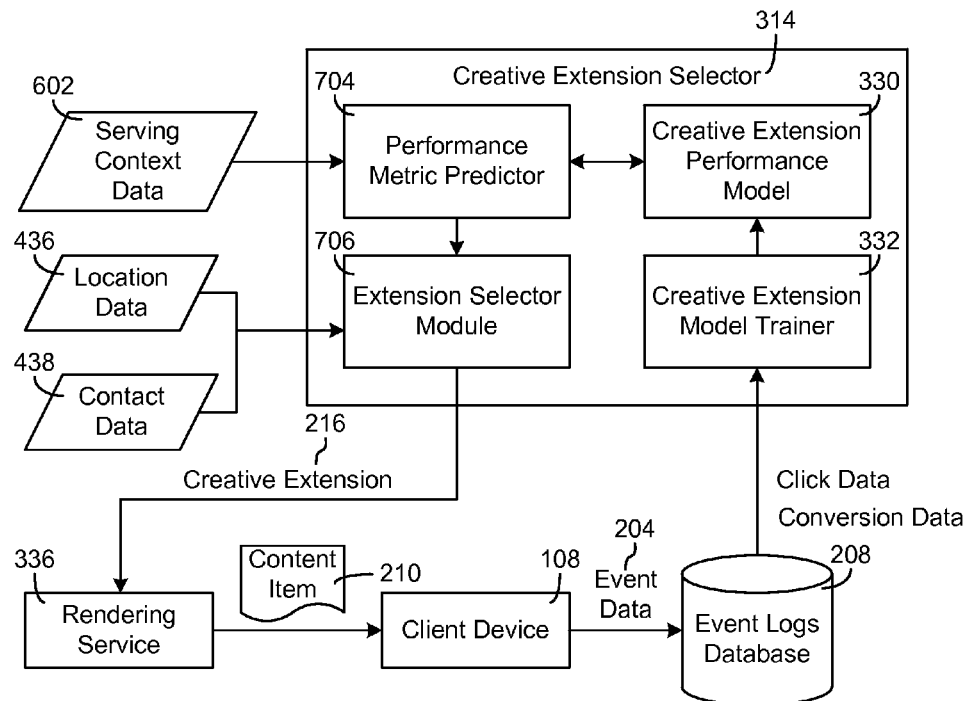
FIG. 7 is a block diagram illustrating the creative extension selector of FIG. 3 in greater detail, according to a described implementation.

Referring now to FIG. 7, creative extension selector 314 is shown in greater detail, according to a described implementation. Creative extension selector 314 may be configured to select a creative extension 216 for use in content item 210. Creative extension 216 may be a supplemental element of content item 210 in addition to the primary creative 212. Creative extensions 216 may include various buttons or clickable elements that cause different actions when selected (e.g., displaying a map, initiating a telephone call, navigating to landing resource 318, etc.) Creative extension selector 314 may select creative extension 314 from multiple potential creative extensions based on the serving context for content item 210 and/or the data assets extracted by content extractor 308.

Creative extension selector 314 is shown to include a creative extension model trainer 332. Creative extension model trainer 332 may be configured to access event logs database 208 to retrieve event data 204. Event data 204 may describe the performance of content items that were previously served to client device 108 in various serving contexts. Event data 204 may include logged user actions such as clicks, conversions, and/or other user behaviors with respect to previously-served content items. Event data 204 may include attributes of the previously-served content items (e.g., click type, creative ID, creative extensions, content type, etc.) and details of the serving context (e.g., device type, device location, content platform, publisher page classification, landing resource ID, etc.). Creative extension model trainer 332 may use the data from event logs database 208 to train and update creative extension performance model 330.

Still referring to FIG. 7, creative extension selector 314 is shown to include a performance metric predictor 704 and a creative extension performance model 330. Performance metric predictor 704 may provide creative extension performance model 330 with serving context data 602. Serving context data 602 may be received as part of content request 202 and may describe the context in which content item 210 will be presented. Serving context data 602 may include a landing resource ID (e.g., a URL), a landing resource type (e.g., a page classification), a device type (e.g., mobile, tablet, desktop, etc.), a content platform (e.g., video, text, image, etc.), a device location, a user profile ID associated with content request 202, a creative ID, or other information describing a particular serving context.

Performance metric predictor 704 may use creative extension performance model 330 to calculate a predicted performance (e.g., pCTR) of content items having various types of creative extensions for the serving context indicated by serving context data 602. Performance metric predictor 704 may generate a score or ranking for each type of creative extension based on the predicted performance of the creative extension. In some implementations, performance metric predictor 704 predicts the performance of content items having a "click-to-call" button, a "location" button, a "secondary resource" button, and/or other types of creative extensions that can be included in content item 210.

The click-to-call button may initiate a telephone call or other communication with the entity associated with the content item (e.g., a retail store, a customer service line, a sales representative, etc.). For other device types (e.g., a desktop computer, a tablet, etc.) a "click-to-email" button or more general "click-to-contact" button may be included in place of the click-to-call button when contact information is known.

The location button may cause a map depicting the extracted geographic location to be displayed. If the serving context indicates that content item 210 will be presented on a mobile device, selecting the location button may cause a maps application or navigation application to be loaded. In some implementations, selecting the location button causes client device 108 to navigate to a maps resource (e.g., Google Maps).

The secondary resource button may cause client device 108 to navigate to secondary resource 320. Content item 210 may include creative extensions (e.g., selectable buttons or links) for multiple different resources or portions of a resource (e.g., secondary resource 320, a social resource, landing resource 318, etc.). In some implementations, content item 210 links only to secondary resource 320 (and not landing resource 318) and may be referred to as a social content item. In other implementations, content item 210 links to both landing resource 318 and secondary resource 320. Performance metric predictor 704 may calculate a predicted performance for content items having various types of creative extensions based on the context in which the content item will be presented.

Still referring to FIG. 7, creative extension selector 314 is shown to include an extension selector module 706. In some implementations, extension selector module 706 receives location data 436. Location data 436 may be extracted from various data sources such as landing resource 318, secondary resource 320, customer information database 322, or received from client device 108. Location data 436 may include a physical or geographic location of a business or entity associated with content item 210. For example, if content item 210 is associated with a restaurant chain, location data 436 may include the location of one or more of the restaurants. In some implementations, location data 436 includes the location of client device 108 (e.g., GPS coordinates, WiFi-based location, etc.).

In some implementations, extension selector module 706 receives contact data 438. Contact data 438 may be extracted from various data sources such as landing resource 318, secondary resource 320, customer information database 322. Contact data 438 may include contact information for a business or other entity associated with content item 210. Contact data 438 may include a telephone number, an email address, a webpage URL (e.g., the URL for landing resource 318 or secondary resource 320), or other types of information that can be used to contact or communicate with the business or entity associated with content item 210.

Extension selector module 706 may use serving context data 602, location data 436, and/or contact data 438 to determine which of a plurality of creative extensions are available for selection. Different types of creative extensions may be available under different circumstances. For example, the click-to-call button may be available for selection if the serving context for content item 210 indicates that content item 210 will be presented a mobile communications device. In some implementations, the click-to-call button may be available for selection if contact data 438 includes a telephone number or other contact information. The location button may be available for selection when a geographic location (e.g., street address, store location, mailing address, GPS coordinates, etc.) is extracted by content extractor 308 or when the location of client device 108 is known. The secondary resource button may be available for selection when the identity of secondary resource 320 is known.

Extension selector module 706 may be configured to select a creative extension or combination of creative extensions from a set of creative extensions for which content performance is predicted by performance metric predictor 704. In some implementations, performance metric predictor 704 predicts the performance of content items for the various types of creative extensions that are available for selection. Extension selector module 706 may consider one or more performance metrics and select one or more creative extensions that optimize such performance metrics. Creative extension selector module 706 may output an indication of a particular creative extension 216 or combination of creative extensions 216 to rendering service 336.

Still referring to FIG. 7, rendering service 336 may combine creative extension 216 with creative 212 and click type 214 to generate and render content item 210. In some implementations, rendering service 336 is a component of client device 108 (e.g., a web browser operating on client device 108). In other implementations, rendering service 336 may be a component of content generation system 114. Each of creative 212, click type 214, and creative extension 216 may include rendering instructions specific to the selected creative, click type, or creative extension. For example, click type 214 may include instructions for rendering a subset of content item 210 as a clickable element for the button click type, or the entire area of content item 210 as a clickable element for the whole content item click type. Rendering service 336 may be configured to render content item 210 according to the instructions provided by creative 212, click type 214, and creative extension 216.

Content item 210 may be served to client device 108. User interactions with content item 210 (e.g., impressions, clicks, conversions, etc.) may be logged and stored in event logs database 208. Content generation system 114 may use the logged events to calculate performance metrics associated with content item 210 and to train predictive models 326 and 330. Content generation system 114 may use predictive models 326 and 330 to determine which feature or combination of features (e.g., click type, creative extension, etc.) of the content items are estimated to result in optimal content performance for a given serving context (e.g., features that optimize CTR, pCTR, or another performance metric). Content generation system 114 may then automatically create new content items having the features estimated to result in optimal content performance.

Figure 8:
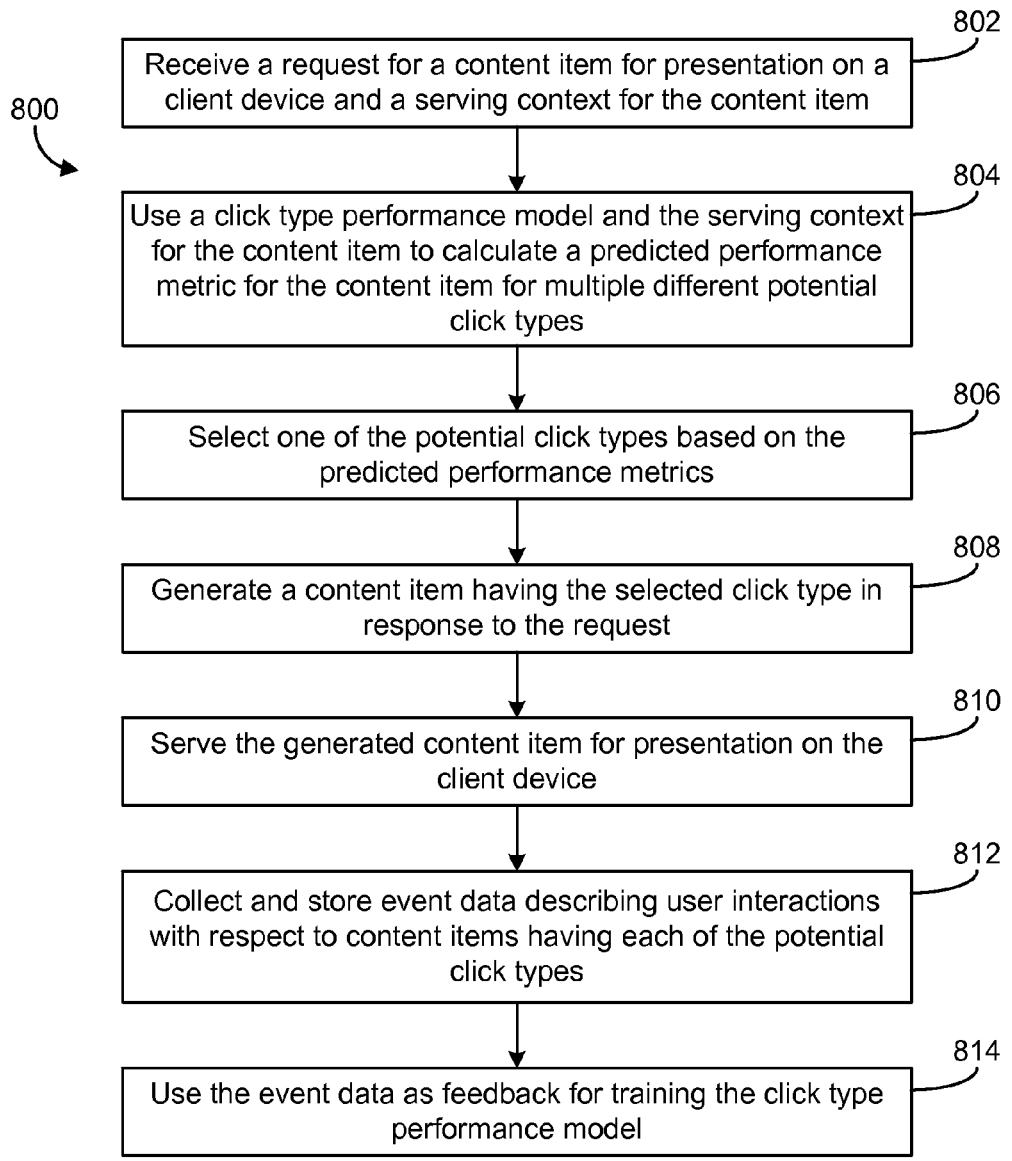
FIG. 8 is a flowchart of a process for optimizing content performance using click types, according to a described implementation.

Referring now to FIG. 8, a flowchart of a process 800 for optimizing content performance using click types is shown, according to a described implementation. Process 800 may be performed by content generation system 114 as described with reference to FIGS. 1-7. In some implementations, process 800 is performed by processing circuit 302 using processor 304 and one or more of the modules stored in memory 306. In various implementations, the steps of process 800 may be rearranged (i.e., performed in a different order) or performed concurrently.

Process 800 is shown to include receiving a request for a content item for presentation on a client device (step 802). The request for a content item may include an indication of a serving context for the content item. The indication of a serving context may include serving context data such as a landing resource ID (e.g., a URL), a landing resource type (e.g., a page classification), a device type (e.g., mobile, tablet, desktop, etc.), a content platform (e.g., video, text, image, etc.), a device location, user interests, or other information describing a particular serving context. The request for a content item may be received from content requestors 104, from a content server, a real-time bidding system, or from client device 108. In some implementations, the request for a content item is received from client device 108 as part of an online content serving process (e.g., a request for an advertisement for display on a webpage).

Still referring to FIG. 8, process 800 is shown to include using a click type performance model and the serving context for the content item to calculate a predicted performance metric for the content item for multiple different potential click types (step 804). In some implementations, the performance metric is a click-through rate. Each of the potential click types may define different criteria for defining a click for purposes of calculating the click-through rate. For example, the potential click types may include a button click type that defines a click as a user interaction with a first portion of the content item excluding user interactions with a second portion of the content item separate from the first portion. The potential click types may include a whole content item click type that defines a click as a user interaction with any portion of the content item. The potential click types may include a confirmation click type that defines a click as a user interaction with the content item that occurs while a confirmation prompt is displayed. The confirmation prompt may be displayed in response to a previous user interaction with the content item.

Each of the potential click types may define different criteria for triggering an event that occurs in response to a user interaction with the content item when the defined criteria are satisfied. For example, each of the potential click types may define different user actions with respect to the content item (e.g., clicking on a button, clicking anywhere within the display area of the content item, clicking on the content item in response to a confirmation prompt, etc.). The triggered event may include navigating to a landing resource, a secondary resource, initiating a communication, displaying a map, launching an application, or any other event that can be triggered automatically. Different click types may require different types of user interactions to trigger the event.

Still referring to FIG. 8, process 800 is shown to include selecting one of the potential click types based on the predicted performance metrics (step 806). Step 806 may include selecting a click type associated with an extremum of the predicted performance metrics. In some implementations, step 806 includes selecting a button click type. If the button click type is selected, process 800 may include defining the criteria for triggering the event as a user interaction with a first portion of the content item (excluding user interactions with a second portion of the content item separate from the first portion) and rendering a clickable button that occupies only the first portion of the content item.

In some implementations, step 806 includes selecting a whole content item click type. If the whole content item click type is selected, process 800 may include defining the criteria for triggering the event as a user interaction with any portion of the content item and rendering an entire display area of the content item as a clickable element.

In some implementations, step 806 includes selecting a confirmation click type. If the confirmation click type is selected, process 800 may include displaying a confirmation prompt in response to a first user interaction with the content item and defining the criteria for triggering the event as a second user interaction with the content item occurring after the first user interaction and while the confirmation prompt is displayed.

Still referring to FIG. 8, process 800 is shown to include generating a content item having the selected click type (step 808) and serving the generated content item for presentation on the client device (step 810). The content item may be generated in response to the request received in step 802 as part of a real-time serving process. Step 808 may include combining the selected click type with a selected creative and/or a selected creative extension. In some implementations, step 808 includes rendering the content item according to instructions provided by the selected click type. Rendering the content item may be performed by a remote rendering service or by the client device. In some implementations, step 810 occurs prior to step 808. For example, the selected click type may be provided to the client device and the client device may render the content item using the selected click type.

Still referring to FIG. 8, process 800 is shown to include collecting and storing event data describing user actions with respect to content items having each of the potential click types (step 812). Event data may describe the performance of content items that were previously served to the client device or other client devices in various serving contexts. Event data may include logged user actions such as clicks, conversions, and/or other user behaviors with respect to previously-served content items. Event data may include attributes of the previously-served content items (e.g., click type, creative ID, creative extensions, content type, etc.) and details of the serving context (e.g., device type, device location, content platform, publisher page classification, landing resource ID, etc.).

Still referring to FIG. 8, process 800 is shown to include using the event data as feedback for training the click type performance model (step 814). Step 814 may be performed by click type model trainer 328 as described with reference to FIGS. 3 and 6. In some implementations, step 814 includes accessing an event logs database (e.g., database 208) to retrieve the event data and/or performance metrics. Step 814 may include using the data from the event logs database to train and/or update the click type performance model to ensure that the click type performance model accurately predicts content performance for various click types.

Figure 9:
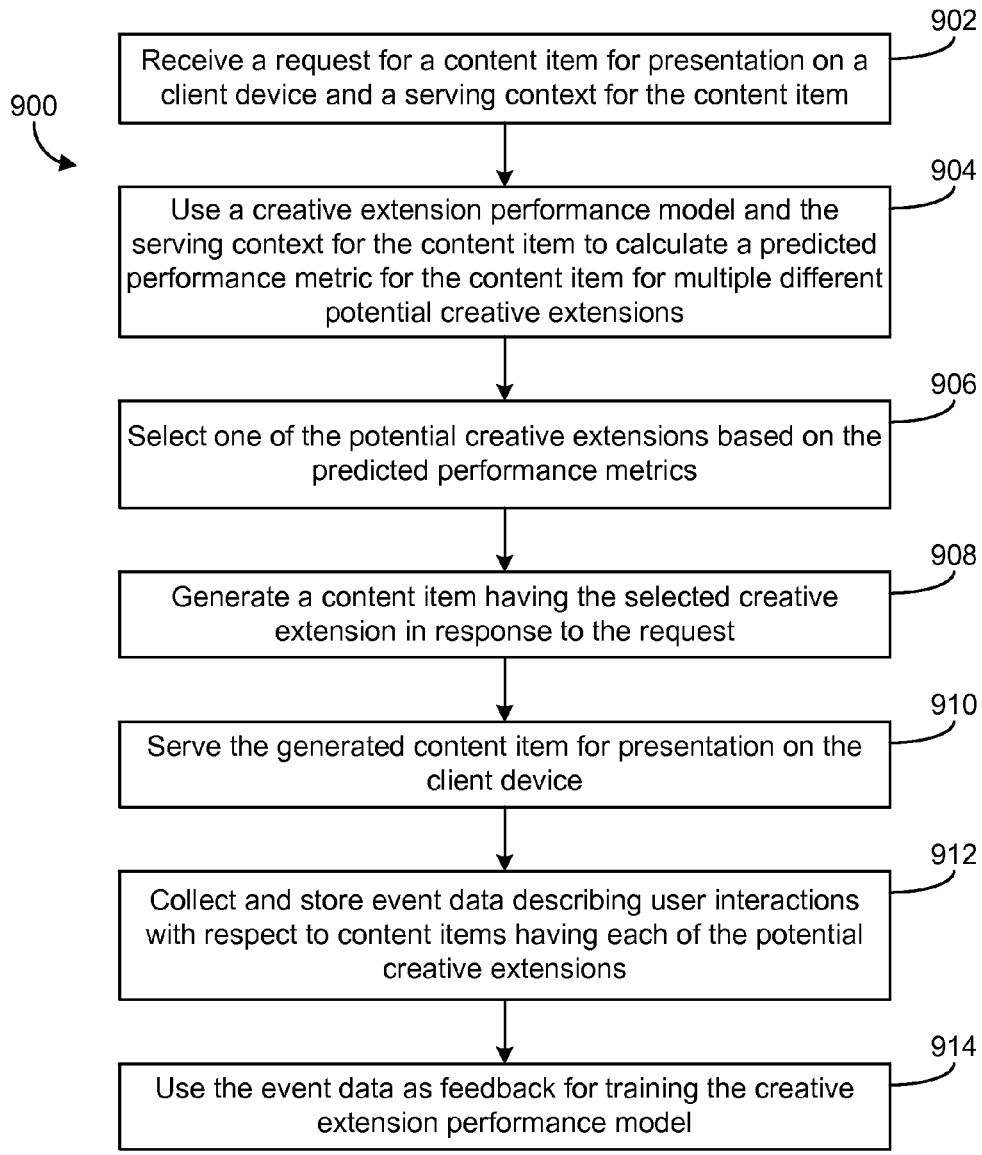
FIG. 9 is a flowchart of a process for optimizing content performance using creative extensions, according to a described implementation.

Referring now to FIG. 9, a flowchart of a process 900 for optimizing content performance using creative extensions is shown, according to a described implementation. Process 900 may be performed by content generation system 114 as described with reference to FIGS. 1-7. In some implementations, process 900 is performed by processing circuit 302 using processor 304 and one or more of the modules stored in memory 306. In various implementations, the steps of process 900 may be rearranged (i.e., performed in a different order) or performed concurrently.

Process 900 is shown to include receiving a request for a content item for presentation on a client device (step 902). The request for a content item may include an indication of a serving context for the content item. The indication of a serving context may include serving context data such as a landing resource ID (e.g., a URL), a landing resource type (e.g., a page classification), a device type (e.g., mobile, tablet, desktop, etc.), a content platform (e.g., video, text, image, etc.), a device location, user interests, or other information describing a particular serving context. The request for a content item may be received from content requestors 104, from a content server, a real-time bidding system, or from client device 108. In some implementations, the request for a content item is received from client device 108 as part of an online content serving process (e.g., a request for an advertisement for display on a webpage).

Still referring to FIG. 9, process 900 is shown to include using a creative extension performance model and the serving context for the content item to calculate a predicted performance metric for the content item for multiple different potential creative extensions (step 904). In some implementations, the performance metric is a click-through rate. Each of the potential creative extensions may define different actions that occur in response to a user interaction with the content item. For example, the potential creative extensions may include a click-to-call extension that causes the client device to initiate a communication with an entity associated with the content item. The potential creative extensions may include a location extension that launch a maps application or display a geographic location associated with the content item. The potential creative extensions may include a secondary resource extension that causes the client device to navigate to a secondary resource associated with the content item.

Still referring to FIG. 9, process 900 is shown to include selecting one of the potential creative extensions based on the predicted performance metrics (step 906). Step 906 may include selecting a creative extension associated with an extremum of the predicted performance metrics. In some implementations, step 906 includes using the serving context for the content item to determine which of the potential creative extensions are available for selection. For example, a click-to-call extension may be available for selection if the client device is identified as a mobile phone, but not if the client device is identified as a desktop computer.

In some implementations, step 906 includes using the identity of a creative portion of the content item to determine which of the potential creative extensions are available for selection. For example, the "location" creative extension may be available for selection for content items that feature a restaurant chain and may provide the location of the nearest restaurant location in the chain. However, the location creative extension may not be available for selection for content items that feature a product or service that is only sold online and has no physical locations that a user could potentially visit.

In some implementations, step 906 includes extracting data assets from the landing resource, a secondary resource associated with the landing resource, and/or a customer information database. Step 906 may include using the extracted data assets to determine which of the potential creative extensions are available for selection. Determining which of the potential creative extensions are available for selection may include identifying a data asset required for a creative extension, determining whether the identified data asset has been extracted, and determining that the creative extension is unavailable for selection in response to a determination that the required data asset has not been extracted.

Still referring to FIG. 9, process 900 is shown to include generating a content item having the selected creative extension (step 908) and serving the generated content item for presentation on the client device (step 910). The content item may be generated in response to the request received in step 902 as part of a real-time serving process. Step 908 may include combining the selected creative extension with a selected creative and/or a selected click type. In some implementations, step 908 includes rendering the content item according to instructions provided by the selected creative extension (e.g., rendering the creative extension as a selectable button). Rendering the content item may be performed by a remote rendering service or by the client device. In some implementations, step 910 occurs prior to step 908. For example, the selected creative extension may be provided to the client device and the client device may render the content item using the selected creative extension.

Still referring to FIG. 9, process 900 is shown to include collecting and storing event data describing user actions with respect to content items having each of the potential creative extensions (step 912). Event data may describe the performance of content items that were previously served to the client device or other client devices in various serving contexts. Event data may include logged user actions such as clicks, conversions, and/or other user behaviors with respect to previously-served content items. Event data may include attributes of the previously-served content items (e.g., click type, creative ID, creative extensions, content type, etc.) and details of the serving context (e.g., device type, device location, content platform, publisher page classification, landing resource ID, etc.).

Still referring to FIG. 9, process 900 is shown to include using the event data as feedback for training the creative extension performance model (step 914). Step 914 may be performed by creative extension model trainer 332 as described with reference to FIGS. 3 and 7. In some implementations, step 914 includes accessing an event logs database (e.g., database 208) to retrieve the event data and/or performance metrics. Step 914 may include using the data from the event logs database to train and/or update the creative extension performance model to ensure that the creative extension performance model accurately predicts content performance for various types of creative extensions.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for optimizing content performance, the method comprising:

receiving, at a processing circuit, a request for third-party content to present on a client device, the request indicating a serving context for the third-party content;

selecting, by the processing circuit and in response to the request, a creative of a third-party content provider for presenting within a third-party content item to the client device;

identifying, by the processing circuit and based on the serving context, a plurality of creative extension types available for inclusion in the third-party content item, each of the plurality of creative extension types defining a different action that occurs in response to a user interaction with the third-party content item;

calculating, by the processing circuit and using a creative extension performance model and the serving context, a plurality of predicted performance metric values of the third-party content item, each predicted performance metric value representing a corresponding predicted performance of the content item when a respective creative extension having one of the plurality of creative extension types is included in the third-party content item;

selecting, by the processing circuit, a creative extension having a creative extension type associated with a highest predicted performance metric value among the plurality of predicted performance metric values of the third-party content item calculated using the creative extension performance model;

generating, by the processing circuit and in response to the request, the third-party content item having the selected creative and the selected creative extension; and serving the generated third-party content item to the client device.

2. The method of claim 1, further comprising:

collecting and storing event data describing user actions with respect to third-party content items having creative extensions associated with the plurality of creative extension types; and using the event data as feedback for training the creative extension performance model.

3. The method of claim 1, further comprising:

extracting data assets from at least one of a landing resource associated with the third-party content provider, a secondary resource associated with the landing resource, and a customer information database; and using the extracted data assets to determine which of the plurality of creative extension types are available for inclusion in the third-party content item.

4. The method of claim 3, wherein using the extracted data assets to determine which of the plurality of creative extension types are available for inclusion in the third-party content item comprises:

identifying a data asset required for generating a first creative extension associated with a first creative extension type;

determining whether the identified data asset has been extracted; and determining that the first creative extension type is unavailable for inclusion in response to a determination that the required data asset has not been extracted.

5. The method of claim 1, wherein selecting the creative extension comprises using the serving context for the third party content to determine which of the plurality of creative extension types are available for inclusion in the third-party content item.

6. The method of claim 1, wherein selecting the creative extension comprises selecting a click-to-call extension, the method further comprising:
using extracted contact information to generate a first creative extension configured to initiate a communication with an entity associated with the third-party content item; and
rendering the generated first creative extension as a selectable element of the third-party content item.

7. The method of claim 1, wherein selecting the creative extension comprises selecting a location extension, the method further comprising:
using extracted location information to generate a first creative extension configured to launch a maps application or display a geographic location associated with the third-party content item; and
rendering the generated first creative extension as a selectable element of the third-party content item.

8. The method of claim 1, wherein selecting the creative extension comprises selecting a secondary resource extension, the method further comprising:
using extracted secondary resource information to generate a first creative extension configured to cause the client device to navigate to a secondary resource associated with the third-party content item; and
rendering the generated first creative extension as a selectable element of the third-party content item.

9. The method of claim 1, wherein the serving context comprises at least one of a type of the client device, a platform of the client device, and a resource in conjunction with which the third-party content item will be presented.

10. A system for optimizing content performance, the system comprising:
a processing circuit having a processor and memory, wherein the processing circuit is configured to:
receive a request for third-party content to present on a client device, the request indicating a serving context for the third-party content;
select, responsive to the request, a creative of a third-party content provider for presenting within a third-party content item to the client device;
identify, based on the serving context, a plurality of creative extension types available for inclusion in the content item, each of the plurality of creative extension types defining a different action that occurs in response to a user interaction with the content item;
calculate, using a creative extension performance model and the serving context, a plurality of predicted performance metric values of the third-party content item, each predicted performance metric value representing a corresponding predicted performance of the content item when a respective creative extension having one of the plurality of creative extension types is included in the third-party content item;
select a creative extension having a creative extension type associated with a highest predicted performance metric value among the plurality of predicted performance metric values of the third-party content item calculated using the creative extension performance model;
generate the third-party content item having the selected creative and the selected creative extension in response to the request; and
serve the generated content item to the client device.

11. The system of claim 10, wherein the processing circuit is configured to:
collect and store event data describing user actions with respect to third-party content items having creative extensions associated with the plurality of creative extension types; and
use the event data as feedback for training the creative extension performance model.

12. The system of claim 10, wherein the processing circuit is configured to:
extract data assets from at least one of a landing resource associated with the third-party content provider, a secondary resource associated with the landing resource, and a customer information database; and
use the extracted data assets to determine which of the plurality of creative extension types are available for inclusion in the third-party content item.

13. The system of claim 12, wherein using the extracted data assets to determine which of the plurality of creative extension types are available for selection comprises:
identifying a data asset required for generating a first creative extension associated with a first creative type;
determining whether the identified data asset has been extracted; and
determining that the first creative extension types is unavailable for selection in response to a determination that the required data asset has not been extracted.

14. The system of claim 10, wherein selecting the creative extension comprises using the serving context for the third party content to determine which of the plurality of creative extension types are available for inclusion in the third-party content item.

15. The system of claim 10, wherein selecting the creative extension comprises selecting a click-to-call extension, wherein the processing circuit is configured to:
use extracted contact information to generate a first creative extension configured to initiate a communication with an entity associated with the third-party content item; and
render the generated first creative extension as a selectable element of the third-party content item.

16. The system of claim 10, wherein selecting the creative extension comprises selecting a location extension, wherein the processing circuit is configured to:
use extracted location information to generate a first creative extension configured to launch a maps application or display a geographic location associated with the third-party content item; and
render the generated first creative extension as a selectable element of the third-party content item.

17. The system of claim 10, wherein selecting the creative extension comprises selecting a secondary resource button, wherein the processing circuit is configured to:
use extracted secondary resource information to generate a first creative extension configured to cause the client device to navigate to a secondary resource associated with the third-party content item; and
render the generated first creative extension as a selectable element of the third-party content item.

18. The system of claim 10, wherein the serving context comprises at least one of a type of the client device, a platform of the client device, and a resource in conjunction with which the third-party content item will be presented.

* * * * *